United States Patent
Jactat et al.

(10) Patent No.: US 9,510,203 B2
(45) Date of Patent: *Nov. 29, 2016

(54) NETWORK ENTITY, COMMUNICATION DEVICE, MOBILE COMMUNICATION DEVICE AND METHOD THEREOF

(71) Applicants: NEC CORPORATION, Tokyo (JP); NEC CASIO MOBILE COMMUNICATIONS, LTD., Kanagawa (JP)

(72) Inventors: Caroline Jactat, Berkshire (GB); Hisashi Futaki, Tokyo (JP); Giorgio Nunzi, Heidelberg (DE)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/795,999

(22) Filed: Jul. 10, 2015

(65) Prior Publication Data

US 2015/0312767 A1  Oct. 29, 2015

Related U.S. Application Data

(63) Continuation of application No. 13/979,033, filed as application No. PCT/JP2012/050881 on Jan. 10, 2012, now Pat. No. 9,119,080.

(30) Foreign Application Priority Data

Jan. 10, 2011 (GB) .................................. 1100305.0

(51) Int. Cl.
  *H04W 24/00* (2009.01)
  *H04W 12/08* (2009.01)
  (Continued)

(52) U.S. Cl.
  CPC ............. *H04W 12/08* (2013.01); *H04W 4/021* (2013.01); *H04W 4/023* (2013.01); *H04W 24/00* (2013.01);
  (Continued)

(58) Field of Classification Search
  CPC ....... H04W 4/02; H04W 4/04; H04W 12/06; H04W 12/12; H04W 24/00
  USPC .................. 455/410, 411, 418, 422.1, 432.1; 370/252, 331
  See application file for complete search history.

(56) References Cited

U.S. PATENT DOCUMENTS

| 2004/0106415 A1 | 6/2004 | Maeda et al. |
| 2007/0182547 A1 | 8/2007 | Wachter et al. |
| 2008/0242316 A1 | 10/2008 | Wang et al. |

FOREIGN PATENT DOCUMENTS

| CN | 1898982 A | 1/2007 |
| JP | 2008206044 A | 9/2008 |

(Continued)

OTHER PUBLICATIONS

"Status of MDT Stage 2 Design in RAN2", 3GPP TSG-RAN WG2 Meeting #71bis, Xi'an, China, Oct. 11-15, 2010, R2-106025, 2 pages.

(Continued)

*Primary Examiner* — Sam Bhattacharya
(74) *Attorney, Agent, or Firm* — Sughrue Mion, PLLC

(57) ABSTRACT

A communication system is described in which a mobile communication device receives MDT configuration requests from a base station or radio network controller to initiate an MDT measurement session for obtaining measurement data and location related data for identifying a location to which said measurement data relates. The mobile communication device checks a user consent indicator in memory and only provides the location related data if the user consent indicator indicates that a user of the mobile communication device consents to the provision the location related data.

8 Claims, 18 Drawing Sheets

(51) Int. Cl.

| H04W 24/08 | (2009.01) |
| H04W 4/02 | (2009.01) |
| H04W 24/10 | (2009.01) |
| H04W 60/00 | (2009.01) |
| G01S 5/02 | (2010.01) |
| H04W 8/22 | (2009.01) |
| H04W 16/18 | (2009.01) |

(52) U.S. Cl.
CPC ............. *H04W 24/08* (2013.01); *H04W 24/10* (2013.01); *H04W 60/00* (2013.01); *G01S 5/0205* (2013.01); *H04W 8/22* (2013.01); *H04W 16/18* (2013.01)

(56) References Cited

FOREIGN PATENT DOCUMENTS

| JP | 2010028729 A | 2/2010 |
| JP | 2010-93706 A | 4/2010 |
| RU | 2282952 C2 | 1/2006 |
| WO | 2007/025143 A1 | 3/2007 |
| WO | 2007/027166 A2 | 3/2007 |
| WO | 2008/153321 A2 | 12/2008 |
| WO | 2009018762 A1 | 2/2009 |
| WO | 2010/091424 A2 | 8/2010 |

OTHER PUBLICATIONS

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); 3GPP TS 37.320 V10.0.0, Dec. 2010, 17 pages.
3rd Generation Partnership Project; Technical Specification Group Services and System Aspects; Telecommunication management; Integration of device management information with Itf-N; 3GPP TR 32.827 V10.1.0, Jun. 2010, 23 pages.
3rd Generation Partnership Project; Technical Specification Group Services and System Aspects; Telecommunication management;; Subscriber and equipment trace; Trace control and configuration management; 3GPP TS 32.422 V10.2.0, Dec. 2010, 106 pages.
3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2, 3GPP TS 37.320 V1.0.0, Aug. 2010, 15 pages.
Communication dated Apr. 7, 2015, issued by the Russian Patent Office in counterpart Application No. 2013137239/07.
Communication dated Apr. 7, 2015, issued by the Russian Patent Office in counterpart Application No. 2014106981/07.
Huawei, "Comparison of architectures for the minimization of drive tests", 3GPP TSG-SA5 (Telecom Management) Meeting SA5#67, Aug. 31-Sep. 4, 2009, Vancouver, Canada, S5-093334, 4 pages.
Huawei, "Discussion on MDT context transfer", 3GPP TSG-RAN WG3 Meeting #68, Montreal, Canada, May 10-14, 2010, R3-101414, 2 pages.
NEC, "Logged MDT measurement reporting", 3GPP TSG RAN2 Meeting #69bis, Beijing, China, Apr. 12-16, 2010, R2-102230, 3 pages.
NTT DOCOMO, "Discussion on MDT security", 3GPP TSG-SA3 (Security), SA3#61, Sorrento, Italy, Nov. 15-19, 2010, S3-101270, 2 pages.
NTT DOCOMO, "draft review of MDT design and reply LS on Security Issues with Logged MDT", 3GPP TSG-SA WG3 Meeting #61, Sorrento, Italy, Nov. 15-19, 2010, S3-101271, 2 pages.
NTT DOCOMO, "review of MDT design and reply LS on Security Issues with Logged MDT", 3GPP TSG-SA WG3 Meeting #61, Sorrento, Italy, Nov. 15-19, 2010, S3-101422, 2 pages.
Office Action, dated Jun. 3, 2014, issued by the Japanese Patent Office, in counterpart Application No. 2013-548101.
Qualcomm Europe, "Management aspects of minimization of drive tests (MDT)", 3GPP TSG-RAN WG2 meeting #66bis, Los Angeles, United States, Jun. 29-Jul. 3, 2009, R2-094015, 3 pages.
Qualcomm Incorporated, "MDT architecture consideration", 3GPP TSG-RAN WG2 meeting #69, San Francisco, United States, Feb. 22-26, 2010, R2-101516, 2 pages.
Samsung, "Procedure for logged MDT in idle", 3GPP TSG RAN WG2 #69bis, Beijing, China, Apr. 12-16, 2010, R2-102292, 3 pages.
Search Report, dated Apr. 27, 2011, issued by the Intellectual Property Office of the United Kingdom, in counterpart Application No. GB1100305.0.
Communication dated Oct. 20, 2015 from the Japanese Patent Office in counterpart application No. 2015-021046.
NTT DOCOMO, Inc., Further clarification on the necessity of log type 3 of the summary of email discussion 71#51, R2-105737, 3GPP, Oct. 2011. (5 pages).
NTT DOCOMO, Inc., (Email Discussion Rapporteur), Summary of email discussion [71#51] UMTS/LTE: MDT-Potential enhancements related to location info reporting, R2-105738, 3GPP, Oct. 2010. (15 pages).
Huawei, Principles for immediate MDT, R2-103197, 3GPP, May 2010. (2 pages).
SA WG3, Review of MDT design and reply LS on Security Issues with Logged MDT, S3-101401, 3GPP, Nov. 2010. (document showing well-known art) (2 pages).
SA WG3, Review of MDT design and reply LS on Security Issues with Logged MDT, R2-106876, 3GPP, Nov. 15-19, 2010 (document showing well-known art) (2 pages).
Communication, May 9, 2016, from the State Intellectual Property Office of the P.R.C., in counterpart Chinese application No. 201280005018.X.
Communication dated Aug. 6, 2015 from the State Intellectual Property Office of the People's Republic of China issued in corresponding application No. 201280005018.X.

NETWORK ENTITY, COMMUNICATION DEVICE, MOBILE COMMUNICATION DEVICE AND METHOD THEREOF

CROSS REFERENCE TO RELATED APPLICATIONS

This application is a Continuation of U.S. application Ser. No. 13/979,033, filed Jul. 10, 2013, which is the National Stage entry of PCT/JP2012/050881 filed Jan. 10, 2012, which claims priority from United Kingdom Application No. 1100305.0 dated Jan. 10, 2011, the contents of all of which are incorporated herein by reference in their entirety.

TECHNICAL FIELD

The present invention relates to a communication system in which a mobile communication device is configured for taking measurements, and for reporting those measurements to another communication device. The invention has particular relevance to, but is not limited to, the implementation of an MDT (Minimisation of Drive Tests) procedure in the mobile communication device and other communication devices and entities of the communication system.

BACKGROUND ART

In existing mobile (cellular) communication systems, network operators typically seek to optimise their network coverage based on measurements compiled during so called drive tests. Specifically, an operator can have a technician drive a vehicle around the network using specialist equipment to measure performance from a subscriber's perspective. The equipment typically comprises a special test mobile communications device and a wideband scanner, connected to data logging and analysis equipment such as a portable computer. Some drive test equipment is configured for remote operation, thereby allowing equipment to be placed in fleet vehicles (such as taxis, buses, delivery vehicles or the like), for automatic data collection.

Drive tests provide a good source of RF data, in association with related geographic positional information that can be used to identify and resolve coverage problems or the like. However, measurements can be time-consuming, expensive to perform, and often do not accurately represent the experience of a real pedestrian user, such as a user in a building or at a significant distance from a road. Moreover, with the extensive geographical coverage of mobile communication networks, drive tests can result in significant emissions of $CO_2$ with the well known associated environmental issues.

Accordingly, the 3rd Generation Partnership Project (3GPP) proposed the development of automated solutions, including the involvement of mobile communication devices (User Equipment (UE)) in the field, in order to minimise operator costs, and the environmental impacts, of network deployment and operation. Studies carried out in response to this proposal demonstrated the feasibility of implementing procedures for minimising the need for drive tests (referred to herein as 'Minimisation of Drive Tests' or 'MDT' procedures, but also known as 'management of UE based network performance measurements'), in which the UE takes measurements for use by the network to improve network optimisation and efficiency. More specifically, these studies demonstrated the feasibility of using control plane solutions for acquiring the measurements from devices. This information, together with information available in the radio access network can then be used for coverage optimisation purposes.

In current proposals for MDT procedures, a MDT capable UE is initially configured to perform MDT measurements by the network. On configuration, the MDT capable UE sends detailed user location information comprising, for example, GNSS (Global Navigation Satellite System) data (if available) and/or Radio Frequency fingerprints, along with the reported UE measurements, when requested to do so by the network. This detailed user location information is particularly useful for MDT as it allows an operator accurately to associate the geographical location of the user, within a particular radio cell, with the associated radio measurements; thereby allowing network coverage issues (e.g. coverage holes) to be located accurately.

SUMMARY OF INVENTION

Technical Problem

The MDT data reported from UEs may thus be used to monitor and detect different kinds of coverage problems in the network including, for example:

A coverage hole: A coverage hole is an area where the signal level of both serving and allowed neighbour cells is below the level needed to maintain basic service. Coverage holes are usually caused by physical obstructions such as new buildings, hills, or by unsuitable antenna parameters, or just inadequate RF planning. In this case, a UE in coverage hole will suffer from a call drop and radio link failure.

Weak coverage: Weak coverage occurs when the signal level of a serving cell is below the level needed to maintain a planned performance requirement (e.g. the cell edge bit-rate).

Pilot Pollution: In areas where coverage of different cells overlap a lot, interference levels are high, power levels are high, energy consumption is high and cell performance may be low. This phenomenon has been called "pilot pollution", and the problem can be addressed by reducing coverage of cells. In this case a UE may experience high signal to noise ratio to more than one cell and high interference levels.

Overshoot coverage: Overshoot occurs when coverage of a cell exceeds the planned coverage. It can also occur as an effective 'island' of coverage within another cell, which may not be a direct neighbour. Overshoot may occur as the result of reflections in buildings or across open water, lakes etc. A UE in the overshoot area may suffer call drops, or high interference.

Poor uplink coverage: Poor uplink coverage might impact user experience in terms of call setup failure, dropped calls, poor uplink voice quality, or the like. Therefore, coverage needs to be balanced between uplink and downlink connections. Possible uplink coverage optimisation includes adapting the cellular coverage by changing the site configuration (antennas) and/or adjusting the uplink related parameters in a way that allows optimised usage of uplink powers in different environments.

It can be seen, therefore, that accurate geographical location data is necessary to determine the position of these coverage problems, and thereby enable the requisite action to address them. However, the provision of such data by a UE also identifies the geographical location of the user operating the UE which is undesirable from the perspective of user privacy. Indeed, in some jurisdictions such privacy is protected by law. In such jurisdictions, the currently proposed procedures cannot, therefore, be implemented legally.

It can be seen, therefore, that there is a need for improved procedures that allow coverage problems to be detected, and accurately located, by acquisition of radio measurements and location information from the UE, but which balances the need for such location information with apparently conflicting requirements for user privacy.

Solution to Problem

The present invention seeks to provide an improved communication system, and associated improved communication devices and methods performed by such devices, which address or at least mitigate the above issues.

According to one exemplary aspect of the invention, therefore, there is provided a method performed by a mobile communication device, the method comprising: receiving signalling, from a further communication device, to initiate a measurement session for obtaining measurement data representing communication conditions in an area in which said mobile communication device is located and location related data for identifying a location to which said measurement data relates; initiating said measurement session; determining from retrieved user consent information whether or not a user of the mobile communication device consents to the provision of said location related data; obtaining said measurement data and said location related data and storing said obtained data in a data log if said retrieved user consent information indicates that a user of the mobile communication device consents to the provision of said location related data; obtaining said measurement data and storing said obtained data in a data log without said location related data if said retrieved user consent information indicates that a user of the mobile communication device does not consent to the provision of said location related data; and sending said data log to said further communication device.

The method may comprise indicating (for example via an application layer) to the user that said location related data will be provisioned to the network if retrieved user consent information includes consent.

If said user consent information changes, during the measurement session (e.g. from indicating that said user consents to the provision of said user information to indicating that said user no longer consents to the provision of said user information, then the method may further comprise: detecting said change in user consent information and deleting any data log compiled during the measurement session without sending said data log to said further communication device in response to detecting said change).

The location related data may comprise detailed location data for identifying a geographic position of the mobile communication device. The location related data may comprise further location related data.

The step of obtaining said measurement data and storing the obtained data in a data log without said location related data, may comprise obtaining said measurement data and storing said obtained data in a data log, without said detailed location data for identifying a geographic position of the mobile communication device, but with further location related data in replacement of said detailed location data.

The step of obtaining said measurement data and storing said obtained data in a data log without said location related data, may comprise obtaining said measurement data and storing said obtained data in a data log, without said detailed location data for identifying a geographic position of the mobile communication device or said further location related data.

The further location related data may comprise location related data that is less precise (or less sensitive) than said detailed location data. The further location related data may comprise radio frequency fingerprint data for at least one cell neighbouring a cell in which said mobile communication device is located. The detailed location related data may comprise data derived from a satellite based positioning system.

The mobile communication device may be one of a selection of mobile communication devices. The method may therefore further comprise identifying a further selection of mobile communication devices from which to obtain measurement data representing communication conditions in an area in which each selected mobile communication device is located and location related data for identifying a location to which said measurement data relates, wherein the further selection may be made taking account of said further location related data being sent in replacement of said detailed location data (e.g. the replacement of said detailed location data indicating that a particular user has not granted consent).

The method may further comprise generating and transmitting a message, to the further communication device, indicating that said data log is available if said retrieved user consent information indicates that a user of the mobile communication device does consent to the provision of said location related data. If said user consent information changes, after generating and transmitting said message indicating that said data log is available, from indicating that said user consents to the provision of said user information to indicating that said user no longer consents to the provision of said user information, then the method may further comprise detecting said change in user consent information; may comprise deleting any data log compiled during the measurement session without sending said data log to said further communication device in response to detecting said change; and/or may comprise sending in response to said received signalling to obtain the data log, a response message including an empty report indication.

The received signalling may comprise a minimisation of drive tests (MDT) configuration message. The received signalling may indicate that said measurement data is to be obtained during a period while the mobile communication device is in an idle state. The received signalling may comprise a logged minimisation of drive tests (MDT) configuration message. The received signalling may indicate that said measurement data is to be obtained during a period while the mobile communication device is in a connected state. The received signalling may comprise an immediate minimisation of drive tests (MDT) configuration message.

According to another exemplary aspect of the invention, therefore, there is provided a method performed by a mobile communication device, the method comprising: receiving signalling, from a further communication device, to initiate a measurement session for obtaining measurement data representing communication conditions in an area in which said mobile communication device is located and location related data for identifying a location to which said measurement data relates, wherein said received signalling comprises configuration data for configuring said measurement session; determining from retrieved user consent information whether or not a user of the mobile communication device consents to the provision of said location related data; initiating said measurement session in accordance with said configuration data, obtaining said measurement data and said location related data, and storing said obtained data in a data log if said retrieved user consent information indicates that a user of the mobile communication device consents to the provision of said location related data; and disregarding said configuration data without initiating said measurement session in accordance with said configuration data, if said retrieved user consent information indicates that a user of the mobile communication device does not consent to the provision of said location related data.

The received signalling may indicate that said measurement data is to be obtained during a period while the mobile communication device is in an idle state. The received signalling may comprise a minimisation of drive tests (MDT) configuration message (e.g. a logged minimisation of drive tests (MDT) configuration message).

The method may comprise generating and transmitting a message, to the further communication device, indicating that said data log is not available if said retrieved user consent information indicates that a user of the mobile communication device does not consent to the provision of said location related data. The method may comprise generating and transmitting a message, to the further communication device, indicating that said data log is available if said retrieved user consent information indicates that a user of the mobile communication device does consent to the provision of said location related data. The transmitted signalling may comprise a radio connection control (RRC) message (e.g. an RRC connection setup complete message, an RRC connection reconfiguration complete, or an RRC connection reestablishment complete message).

According to another exemplary aspect of the invention, therefore, there is provided a method performed by a mobile communication device, the method comprising: receiving signalling, from a further communication device, to initiate a measurement session for obtaining measurement data representing communication conditions in an area in which said mobile communication device is located and location related data for identifying a location to which said measurement data relates, wherein said received signalling comprises configuration data for configuring said measurement session; initiating said measurement session in accordance with said configuration data, obtaining said measurement data and said location related data, and storing said obtained data in a data log; determining from retrieved user consent information whether or not a user of the mobile communication device consents to the provision of said location related data; generating and transmitting a message, to the further communication device, indicating that said data log is available if said retrieved user consent information indicates that a user of the mobile communication device consents to the provision of said location related data; and generating and transmitting a message, to the further communication device, indicating that said data log is not available if said retrieved user consent information indicates that a user of the mobile communication device does not consent to the provision of said location related data.

The received signalling may indicate that said measurement data is to be obtained during a period while the mobile communication device is in an idle state. The received signalling may comprise a minimisation of drive tests (MDT) configuration message (e.g. a logged minimisation of drive tests (MDT) configuration message).

The generated and transmitted message may comprise an RRC message. The generated and transmitted message may comprise an RRC connection setup complete message, an RRC connection reconfiguration complete message, or an RRC connection reestablishment complete message.

The user consent information may change, after generating and transmitting a message indicating that said data log is available, from indicating that said user consents to the provision of said user information to indicating that said user no longer consents to the provision of said user information. In such a case, the method may further comprise: detecting said change in user information; receiving signalling, from a further communication device, to obtain the data log; sending, in response to said received signalling to obtain the data log, a response message including an empty report indication. The empty report indication may comprise an empty logged MDT report indication indicating that the measurement data and the location data are missing from the data log. The empty report indication may comprise an empty location report indication indicating that at least the location data is missing from the data log.

According to another exemplary aspect of the invention there is provided a method performed by a mobile communication device, the method comprising: receiving signalling, from a further communication device, to obtain measurement data representing communication conditions in an area in which said mobile communication device is located; retrieving information indicating whether or not a user of the mobile communication device consents to the provision of location related data; and sending, in response to said received signalling, a response message indicating user consent or non-consent to the provision of said location related data. The received signalling may comprise signalling to initiate a measurement session for obtaining measurement data representing communication conditions in an area in which said mobile communication device is located and may comprise location related data for identifying a location to which said measurement data relates. The received signalling may indicate that said measurement data is to be obtained during a period while the mobile communication device is in an idle state. The received signalling may comprise a minimisation of drive tests (MDT) configuration message. The received signalling may comprise a logged minimisation of drive tests (MDT) configuration message. The response message may comprises a minimisation of drive tests (MDT) configuration response message.

The method may comprise transmitting a message, to said further communication device, indicating that measurement data is available, wherein said received signalling may be received in response to said transmitted message. The message indicating that measurement data is available, said received signalling, and/or said response message may comprise a radio resource control (RRC) message. The received signalling may comprise a UE information request message. The response message may comprise a UE information report message.

The response message may comprise a dedicated user consent field (e.g. an information element) for indicating user consent to the provision of said location related information.

When said user does not consent to the provision of said location related information, an empty report indication may be provided in said response message thereby indicating that the user does not consent to the provision of said location related information.

The response message may comprise a data log for logging measurement data and location related data and, when said user does not consent to the provision of said location related information, location related information may be omitted from the response message thereby indicating that the user does not consent to the provision of said location related information.

According to another exemplary aspect of the invention there is provided a method performed by a mobile communication device, the method comprising: receiving signalling, from a further communication device, to initiate a measurement session for obtaining measurement data representing communication conditions in an area in which said mobile communication device is located and location related data for identifying a location to which said measurement data relates, wherein said received signalling comprises configuration data for configuring said measurement session and indicates: that said measurement data is to be obtained during a period while the mobile communication device is in an idle state; or that said measurement data is to be obtained during a period while the mobile communication device is in a connected state; wherein when said measurement data is to be obtained during a period while the mobile communication device is in an idle state said method comprises: determining from retrieved user consent information whether or not a user of the mobile communication device consents to the provision of said location related data; initiating said measurement session in accordance with said configuration data, obtaining said measurement data and said location related data, and storing said obtained data in a data log if said retrieved user consent information indicates that a user of the mobile communication device consents to the provision of said location related data; and disregarding said configuration data without initiating said measurement session in accordance with said configuration data, if said retrieved user consent information indicates that a user of the mobile communication device does not consent to the provision of said location related data; and when said measurement data is to be obtained during a period while the mobile communication device is in a connected state said method comprises: initiating said measurement session; determining from retrieved user consent information whether or not a user of the mobile communication device consents to the provision of said location related data; obtaining said measurement data and said location related data and storing said obtained data in a data log if said retrieved user consent information indicates that a user of the mobile communication device consents to the provision of said location related data; obtaining said measurement data and storing said obtained data in a data log without said location related data if said retrieved user consent information indicates that a user of the mobile communication device does not consent to the provision of said location related data; and sending said data log to said further communication device.

When said measurement data is to be obtained during a period while the mobile communication device is in an idle state, the method may comprise: retaining said disregarded configuration data, without initiating said measurement session in accordance with said configuration data, if said retrieved user consent information indicates that a user of the mobile communication device does not consent to the provision of said location related data.

If said user consent information changes from indicating that said user does not consent to the provision of said user information, to indicating that said user does consent to the provision of said user information, then the method may further comprise: initiating said measurement session in accordance with said retained configuration data, obtaining said measurement data and said location related data, and/or storing said obtained data in a data log.

When the measurement data is to be obtained during a period while the mobile communication device is in an idle state, the method may comprise deleting said disregarded configuration data (e.g. if said retrieved user consent information indicates that a user of the mobile communication device does not consent to the provision of said location related data).

According to another exemplary aspect of the invention there is provided a method performed by a mobile communication device, the method comprising: receiving signalling, from a further communication device, to obtain measurement data representing communication conditions in an area in which said mobile communication device is located; retrieving information indicating whether or not a user of the mobile communication device consents to the provision of location related data; and sending, in response to said received signalling, a response message indicating user consent or non-consent to the provision of said location related data.

According to another exemplary aspect of the invention there is provided a method performed by a communication device, the method comprising: signalling, a mobile communication device, to initiate a measurement session for obtaining measurement data representing communication conditions in an area in which said mobile communication device is located and location related data for identifying a location to which said measurement data relates, wherein said location related data comprises detailed location data for identifying a geographic position of the mobile communication device obtaining said measurements; and receiving, from said mobile communication device, a data log comprising said measurement data, without said detailed location related data, but with further location related data in replacement of said detailed location data.

Wherein the further location related data may comprise location related data that is less precise (or less sensitive) than said detailed location data. The further location related data may comprise radio frequency fingerprint data for at least one cell neighbouring a cell in which said mobile communication device is located. The detailed location related data may comprise data derived from a satellite based positioning system.

The method: may further comprise identifying a selection of at least one mobile communication device from which to obtain measurement data representing communication conditions in an area in which each selected mobile communication device is located and location related data for identifying a location to which said measurement data relates; may further comprise signalling each selected mobile communication device, to initiate a measurement session for obtaining the measurement data and the location related data; may further comprise receiving, from each signalled mobile device, a message indicating user consent or non-consent to the provision of said location related data; and/or may further comprise identifying a further selection of mobile communication devices from which to obtain measurement data representing communication conditions in an area in which each selected mobile communication device is located and location related data for identifying a location to which said measurement data relates, wherein said further selection is made taking account of said consent or non-consent.

According to another exemplary aspect of the invention there is provided a method performed by a communication device, the method comprising: identifying a selection of at least one mobile communication device from which to obtain measurement data representing communication conditions in an area in which each selected mobile communication device is located and location related data for identifying a location to which said measurement data relates; signalling each selected mobile communication device, to initiate a measurement session for obtaining the measurement data and the location related data; receiving, from each signalled mobile device, a message indicating user consent or non-consent to the provision of said location related data; and identifying a further selection of mobile communication devices from which to obtain measurement data representing communication conditions in an area in which each selected mobile communication device is located and location related data for identifying a location to which said measurement data relates, wherein said further selection is made taking account of said consent or non-consent.

The method may further comprise sending, to a core network entity a message indicating said user consent or non-consent to the provision of said location related data. The message indicating user consent or non-consent may comprise a data log for logging measurement data and location related data (e.g. where non-consent is indicated by omitting said location related information and/or measurement data from said data log/where consent is indicated by not omitting said location related information and/or measurement data from said data log) thereby indicating that the user does not consent to the provision of said location related information.

The communication device may comprise a device of a radio access network (RAN). The communication device may comprise a base station or a radio network controller (RNC).

According to another exemplary aspect of the invention there is provided a method performed by a network entity, the method comprising: receiving from a communication device a message indicating the consent or non-consent of a user of a mobile communication device to the provision of location related data with measurement data obtained by the mobile communication device during a measurement session; storing user consent information representing said consent or non-consent in association with information identifying said mobile communication device or said user; and providing said user consent information available for the purposes of selecting mobile communication devices from which to obtain measurement data representing communication conditions in an area in which each selected mobile communication device is located and location related data for identifying a location to which said measurement data relates.

The message indicating user consent or non-consent may comprise a data log for logging measurement data and location related data, wherein non-consent may be indicated by omitting said location related information and/or measurement data from said data log thereby indicating that the user does not consent to the provision of said location related information.

The network entity may comprise a core network entity. The network entity may comprise an element manager (EM) or a trace control entity (TCE). The network entity may comprise a home subscriber server (HSS).

According to another exemplary aspect of the invention there is provided a mobile communication device comprising: means for receiving signalling, from a further communication device, to initiate a measurement session for obtaining measurement data representing communication conditions in an area in which said mobile communication device is located and location related data for identifying a location to which said measurement data relates; means for initiating said measurement session; means for determining from retrieved user consent information whether or not a user of the mobile communication device consents to the provision of said location related data; means for obtaining said measurement data and said location related data and storing said obtained data in a data log if said retrieved user consent information indicates that a user of the mobile communication device consents to the provision of said location related data; means for obtaining said measurement data and storing said obtained data in a data log without said location related data if said retrieved user consent information indicates that a user of the mobile communication device does not consent to the provision of said location related data; and means for sending said data log to said further communication device.

The mobile communication device may comprise means for detecting a change in said user consent information.

The mobile communication device may comprise means for receiving signalling from a further communication device, to obtain the data log wherein. When said means for detecting a change in said user consent information detects, after generating and transmitting a message indicating that said data log is available, a change in the user consent information from indicating that said user consents to the provision of said user information to indicating that said user no longer consents to the provision of said user information said mobile communication device may be operable to: remove the stored data log; and may be operable to send, in response to said received signalling to obtain the data log, a response message including an empty report indication.

According to another exemplary aspect of the invention there is provided a mobile communication device comprising: means for receiving signalling, from a further communication device, to initiate a measurement session for obtaining measurement data representing communication conditions in an area in which said mobile communication device is located and location related data for identifying a location to which said measurement data relates, wherein said received signalling comprises configuration data for configuring said measurement session; means for determining from retrieved user consent information whether or not a user of the mobile communication device consents to the provision of said location related data; means for initiating said measurement session in accordance with said configuration data, for obtaining said measurement data and said location related data, and for storing said obtained data in a data log if said retrieved user consent information indicates that a user of the mobile communication device consents to the provision of said location related data; and means for disregarding said configuration data without initiating said measurement session in accordance with said configuration data, if said retrieved user consent information indicates that a user of the mobile communication device does not consent to the provision of said location related data.

According to another exemplary aspect of the invention there is provided a mobile communication device comprising: means for receiving signalling, from a further communication device, to initiate a measurement session for obtaining measurement data representing communication conditions in an area in which said mobile communication device is located and location related data for identifying a location to which said measurement data relates, wherein said received signalling comprises configuration data for configuring said measurement session; means for initiating said measurement session in accordance with said configuration data, for obtaining said measurement data and said location related data, and for storing said obtained data in a data log; means for determining from retrieved user consent information whether or not a user of the mobile communication device consents to the provision of said location related data; means for generating and transmitting a message, to the further communication device, indicating that said data log is available if said retrieved user consent information indicates that a user of the mobile communication device consents to the provision of said location related data; and means for generating and transmitting a message, to the further communication device, indicating that said data log is not available if said retrieved user consent information indicates that a user of the mobile communication device does not consent to the provision of said location related data.

According to another exemplary aspect of the invention there is provided a mobile communication device comprising: means for receiving signalling, from a further communication device, to obtain measurement data representing communication conditions in an area in which said mobile communication device is located; means for retrieving information indicating whether or not a user of the mobile communication device consents to the provision of location related data; and means for sending, in response to said received signalling, a response message indicating user consent or non-consent to the provision of said location related data.

The received signalling may comprise signalling to initiate a measurement session for obtaining measurement data representing communication conditions in an area in which said mobile communication device may be located and location related data for identifying a location to which said measurement data may relate.

According to another exemplary aspect of the invention there is provided a mobile communication device comprising: means for receiving signalling, from a further communication device, to initiate a measurement session for obtaining measurement data representing communication conditions in an area in which said mobile communication device is located and location related data for identifying a location to which said measurement data relates, wherein said received signalling comprises configuration data for configuring said measurement session and indicates: that said measurement data is to be obtained during a period while the mobile communication device is in an idle state; or that said measurement data is to be obtained during a period while the mobile communication device is in a connected state; wherein when said measurement data is to be obtained during a period while the mobile communication device is in an idle state, the mobile communication device is configured for: determining from retrieved user consent information whether or not a user of the mobile communication device consents to the provision of said location related data; initiating said measurement session in accordance with said configuration data, obtaining said measurement data and said location related data, and storing said obtained data in a data log if said retrieved user consent information indicates that a user of the mobile communication device consents to the provision of said location related data; and disregarding said configuration data without initiating said measurement session in accordance with said configuration data, if said retrieved user consent information indicates that a user of the mobile communication device does not consent to the provision of said location related data; and when said measurement data is to be obtained during a period while the mobile communication device is in a connected state, the mobile communication device is configured for: initiating said measurement session; determining from retrieved user consent information whether or not a user of the mobile communication device consents to the provision of said location related data; obtaining said measurement data and said location related data and storing said obtained data in a data log if said retrieved user consent information indicates that a user of the mobile communication device consents to the provision of said location related data; obtaining said measurement data and storing said obtained data in a data log without said location related data if said retrieved user consent information indicates that a user of the mobile communication device does not consent to the provision of said location related data; and sending said data log to said further communication device.

When the measurement data is to be obtained during a period while the mobile communication device is in an idle state, the mobile communication device may be configured for: retaining said disregarded configuration data, without initiating said measurement session in accordance with said configuration data (e.g. if said retrieved user consent information indicates that a user of the mobile communication device does not consent to the provision of said location related data).

When the user consent information changes from indicating that said user does not consent to the provision of said user information, to indicating that said user does consent to the provision of said user information, the mobile communication device may further configured for: initiating said measurement session in accordance with said retained configuration data, obtaining said measurement data and said location related data, and/or storing said obtained data in a data log.

When said measurement data is to be obtained during a period while the mobile communication device is in an idle state, the mobile communication device may be configured for deleting said disregarded configuration data (e.g. if said retrieved user consent information indicates that a user of the mobile communication device does not consent to the provision of said location related data).

According to another exemplary aspect of the invention there is provided a communication device comprising: means for signalling, a mobile communication device, to initiate a measurement session for obtaining measurement data representing communication conditions in an area in which said mobile communication device is located and location related data for identifying a location to which said measurement data relates, wherein said location related data comprises detailed location data for identifying a geographic position of the mobile communication device obtaining said measurements; and means for receiving, from said mobile communication device, a data log comprising said measurement data, without said detailed location related data, but with further location related data in replacement of said detailed location data.

The mobile communication device may be one of a selection of mobile communication devices, said communication device further comprising means for identifying a further selection of mobile communication devices from which to obtain measurement data representing communication conditions in an area in which each selected mobile communication device may be located and location related data for identifying a location to which said measurement data relates, wherein the further selection may be made taking account of the further location related data being sent in replacement of said detailed location data (e.g. the presence of the further location related data being sent in replacement of said detailed location data may indicate a user's non-consent).

According to another exemplary aspect of the invention there is provided a communication device comprising: means for identifying a selection of at least one mobile communication device from which to obtain measurement data representing communication conditions in an area in which each selected mobile communication device is located and location related data for identifying a location to which said measurement data relates; means for signalling each selected mobile communication device, to initiate a measurement session for obtaining the measurement data and the location related data; means for receiving, from each signalled mobile device, a message indicating user consent or non-consent to the provision of said location related data; and means for identifying a further selection of mobile communication devices from which to obtain measurement data representing communication conditions in an area in which each selected mobile communication device is located and location related data for identifying a location to which said measurement data relates, wherein said further selection is made taking account of said consent or non-consent.

According to another exemplary aspect of the invention there is provided a network entity comprising: means for receiving from a communication device a message indicating the consent or non-consent of a user of a mobile communication device to the provision of location related data with measurement data obtained by the mobile communication device during a measurement session; means for storing user consent information representing said consent or non-consent in association with information identifying said mobile communication device or said user; and means for providing said user consent information available for the purposes of selecting mobile communication devices from which to obtain measurement data representing communication conditions in an area in which each selected mobile communication device is located and location related data for identifying a location to which said measurement data relates.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Advantageous Effects of Invention

According to the present invention, it is possible to provide an improved communication system, and associated improved communication devices and methods performed by such devices, which address or at least mitigate the above issues.

DESCRIPTION OF EMBODIMENTS

Figure 1:
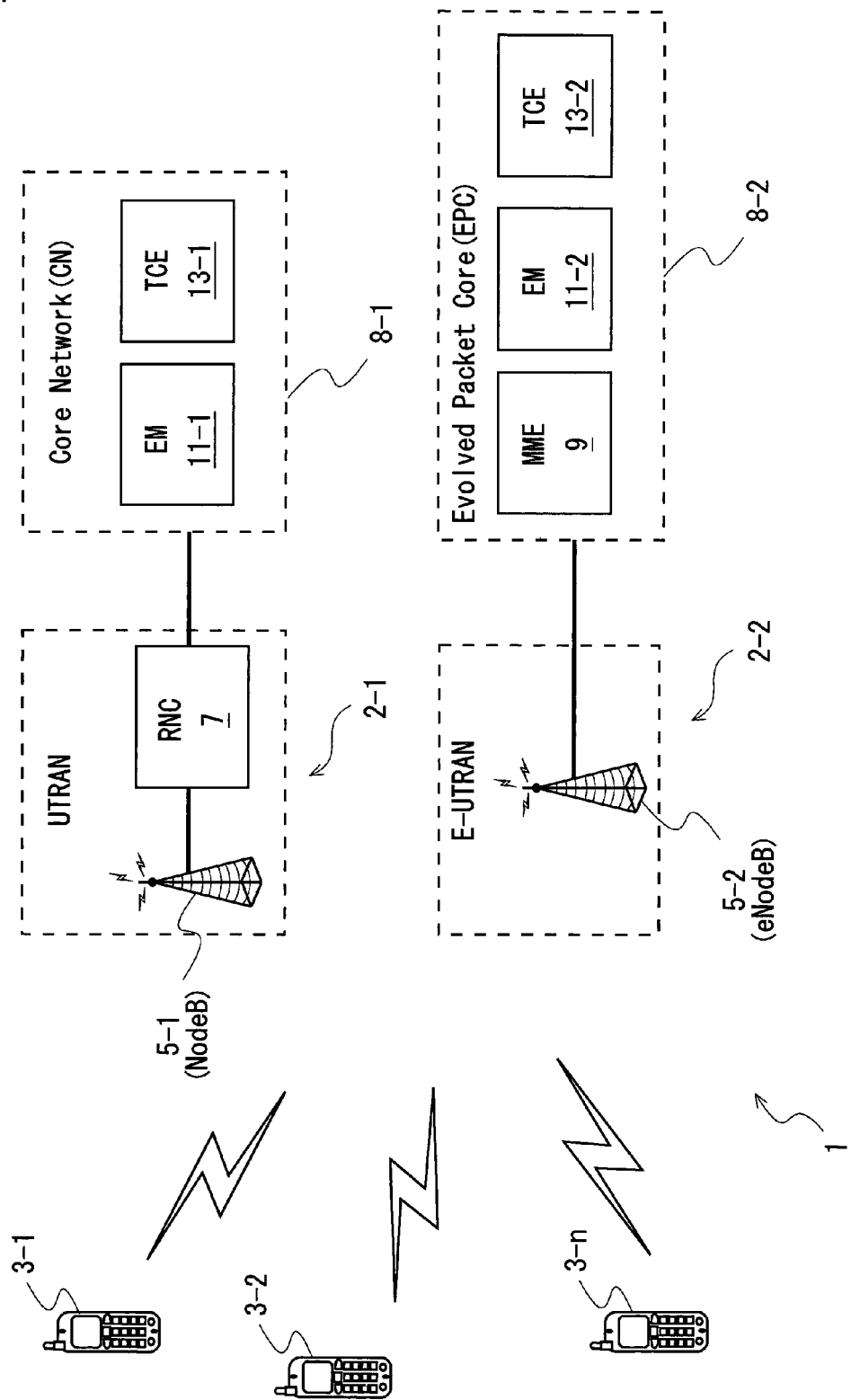
FIG. 1 shows, in simplified overview, a schematic of a communication system.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

The description of the invention with reference to the drawings is by way of example only.

The text of the abstract filed herewith is repeated here as part of the specification. In an exemplary aspect of the invention of the invention there is provided a communication system in which a mobile communication device receives MDT configuration requests from a base station or radio network controller to initiate an MDT measurement session for obtaining measurement data and location related data for identifying a location to which said measurement data relates. The mobile communication device checks a user consent indicator in memory and only provides the location related data if the user consent indicator indicates that a user of the mobile communication device consents to the provision the location related data.

Exemplary embodiments described herein provide for the autonomous collection of UE radio measurements using Control Plane architecture in UTRAN (Universal Terrestrial Radio Access Network), E-UTRAN (Evolved Universal Terrestrial Radio Access Network), or any other similar radio access network, in order to minimise the requirement for drive tests. The MDT procedures described can therefore potentially be used by a network operator to optimise network performances (e.g. to detect coverage holes) and to improve network planning. The MDT procedures described herein also include provisions for protecting the privacy of a user of the UE, in the context of collection of UE radio measurements by a network operator for MDT purposes, and in particular provisions for controlling the reporting of a user's location.

The exemplary embodiments described herein are related to, in particular, the implementation of an MDT procedure for LTE (Long Term Evolution) radio technology. More particularly, the embodiments are related to the implementation of an MDT procedure in a mobile communication device comprising terminal equipment such as a handset (or other such User Equipment (UE)) suitable for accessing an Evolved Packet System (EPS) through an E-UTRAN. The embodiments described herein also relate, in particular, to the implementation of an MDT procedure for UMTS (Universal Mobile Telecommunications System) radio technology and the implementation of the MDT procedure in terminal/user equipment suitable for accessing a Core Network (CN) through a UTRAN.

Overview

FIG. 1 schematically illustrates a mobile (cellular) communication system generally at 1, in which users of a plurality of mobile communication devices (also referred to herein as user equipments (UEs)) 3-1, 3-2 . . . 3-n can communicate with other users (not shown) via a UMTS radio access network 2-1 (UTRAN), or an LTE radio access network 2-2 (E-UTRAN) and a respective network core 8-1, 8-2 (Core Network (CN) 8-1 in the case of the UTRAN 2-1 and Evolved Packet Core (EPC) 8-2 in the case of the E-UTRAN 2-2).

Each radio access network 2-1, 2-2 comprises a respective base station 5-1, 5-2. The base station 5-1 of the UTRAN 2-1 comprises a so called 'NodeB' and the base station 5-2 of the E-UTRAN 2-2 comprises a so called 'eNodeB' (eNB). The UTRAN 2-1 further comprises a Radio Network Controller (RNC) 7. A separate RNC is not shown for the E-UTRAN 2-2 because the radio network control functionality of the E-UTRAN 2-2 is integrated with the base station functionality in the eNodeB 5-2.

The devices of the communication system 1 employ MDT procedures for minimising drive test requirements in which selected UEs 3 acquire appropriate radio measurements and report them to the network 2 with, where appropriate, associated location information. The RNC 7 and eNB 2-2 are responsible for selecting the UEs 3 for participation in MDT measurement collection, and for managing the MDT configuration of the MDT measurements in the selected UEs 3.

The devices of the communication system 1 are configured for two different types of MDT measurement: "logged MDT"; and "immediate MDT". "Logged MDT" refers to MDT procedures in which measurements are acquired and logged by the UE 3 when the UE 3 is in an idle mode (i.e. while having no established radio connection with the network). "Immediate MDT" refers to MDT procedures in which measurements are acquired, logged and reported by the UE 3, essentially on demand, while the UE 3 is in a connected mode (i.e. while having a radio connection established with the network).

The MDT procedures are based around the so called "subscriber and equipment trace" functionality described, in particular, in the 3rd Generation Partnership Project technical specifications (TS) entitled:

TS 32.421: "Subscriber and equipment trace: Trace concepts and requirements";

TS 32.422: "Subscriber and equipment trace: Trace control and configuration management"; and TS 32.423: "Subscriber and equipment trace: Trace data definition and management".

The subscriber and equipment trace functionality is adapted to provide very detailed information, at call level, for one or more specific mobile communication devices. The functionality represents an additional source of information, to the more conventional performance measurements, allowing a greater variety of monitoring and optimisation operations. Unlike the more conventional performance measurements (which represent a permanent source of information) trace is activated on demand for a limited period of time and for specific analysis purposes. Trace thus represents a particularly useful tool for activities such as determining the root cause of a malfunctioning UE, advanced troubleshooting, optimisation of resource usage and quality, RF coverage control and capacity improvement, dropped call analysis, Core Network and UTRAN end-to-end UMTS procedure validation.

In accordance with implementing the trace functionality, each network core 8 includes a plurality of functional/logical entities only the most relevant of which are illustrated. The Core Network 8-1 of the UTRAN 2-1 comprises an Element Manager (EM) 11-1, and a Trace Collection Entity (TCE) 13-1. The EPC 8-2 of the E-UTRAN 2-2 comprises a Mobility Management Entity (MME) 9, an Element Manager (EM) 11-2, and a Trace Collection Entity (TCE) 13-2.

The EMs 11 are network management entities whose role is to manage the configuration trace functions in network elements, including managing the configuration of the UE MDT measurements in the RNC 7 (in the case of the UTRAN 2-1) or eNB 5-2 (in the case of the E-UTRAN 2-2). The EMs 11 are also responsible for activating and deactivating the trace sessions during which measurements are acquired.

The TCEs 13 are network entities that manage the collection and collation of the UE measurements as received via their respective base stations 5 (and RNC 7 in the case of the UTRAN 2-1). Each TCE 13 may be located separately to its respective EM 11 or may be co-located with the EM 11 in the same apparatus.

The MME 9 is a control node for the E-UTRAN 2-2 and, in the context of MDT, indicates the permanent UE identity (e.g. IMSI/IMEI(SV), International Mobile Subscriber Identity, International Mobile Equipment Identity (Software Version)) for the UEs 3 selected and configured for MDT measurements to the TCE 13-2 when the E-UTRAN does not have the permanent UE identity available.

In accordance with the requirements of MDT, in addition to radio measurements such as radio reception levels, each UE 3 is able to provide location related information including, for example: detailed location information (where available) such as satellite based positional information (e.g. GNSS/GPS location information) and possibly altitude information; and/or RF fingerprint information for neighbouring cells (e.g. when the detailed location information is unavailable).

Each UE 3 is provided with a 'user consent' indicator comprising a parameter that is provided in a radio (radio resource control (RRC)) layer of the UE 3, and that may be updated using information provided by application layers of the UE 3. The user consent indicator may be set, by a user of the UE 3, to indicate whether or not the user consents to acquisition and transmission, for MDT purposes, of the location related information. The user consent indicator may be set to 'consent' to indicate consent to the provision of such data or 'unconsent' to indicate a lack of such consent. The user is provided with an option to set and/or modify the status of the consent indicator at certain times such as, for example, when the UE is switched on, when the registered network changes, or when the location area changes within the registered network. The user may also set and update the consent indicator manually.

In operation, therefore, the user consent indicator can be set, in the radio (radio resource control (RRC)) and application layers of the UE 3, for each MDT configuration (e.g. when the public land mobile network (PLMN) changes and/or when a location area within the PLMN changes). Specifically, if the RRC layer receives an MDT Configuration, an indication can be given to the application layers that location related information is required for MDT purposes so that the application layers can prompt the user to confirm consent (or lack of consent). The RRC layer then waits for the user confirmation before actually logging the user location.

If the user does not consent to provision of the location related data (consent indicator set to 'unconsent'), the UE 3 inhibits the logging/reporting of detailed user location or any other location related information (e.g. radio frequency fingerprints). The UE 3 can, nevertheless, still report other information useful for MDT purposes (e.g. the results of radio measurements such as radio reception levels or the like) but with the location related information omitted from the MDT report.

If the user does consent to provision of the location related data (consent indicator set to 'consent'), or if the consent is updated from 'unconsent' to 'consent', then the UE 3 starts (or resumes) logging/reporting the location related information. If the consent is updated from 'consent' to 'unconsent', and some location related information has already been logged then the UE 3 is able to flush the logged information to prevent its transmission to the network and, when requested to report the MDT information, to respond with an empty MDT measurement report.

The UE 3 is also able to indicate to the network that there are no logs to be retrieved in legacy RRC messages by not including a log availability indication (e.g. RRC connection set-up, RRC connection reconfiguration, RRC connection reestablishment). Accordingly, when the user consent indicator is set to "unconsent", and a situation arises in which a message is to be sent that can be used to indicate log availability, the UE 3 indicates that there are no logs to be retrieved.

For the purposes of RAN selection of UEs 3 for MDT purposes, the RAN 2-1, 2-2 is able to deduce, when it receives an empty MDT report, or when it receives an MDT report in which location related data is omitted (e.g. detailed location information and/or radio frequency fingerprints are missing), that alternative (or possibly additional) UEs 3 need to be selected. The RAN 2-1, 2-2 is thus able to proactively respond to a lack of user consent by reselecting UEs 3 to ensure the selection of UEs 3 whose users have consented to the provision of location related information.

Accordingly, the communication system 1 allows coverage problems to be detected, and accurately located, by acquisition of radio measurements and location related information from the selected UEs 3, but balances the need for such location information with apparently conflicting requirements for user privacy.

Mobile Communication Device

Figure 2:
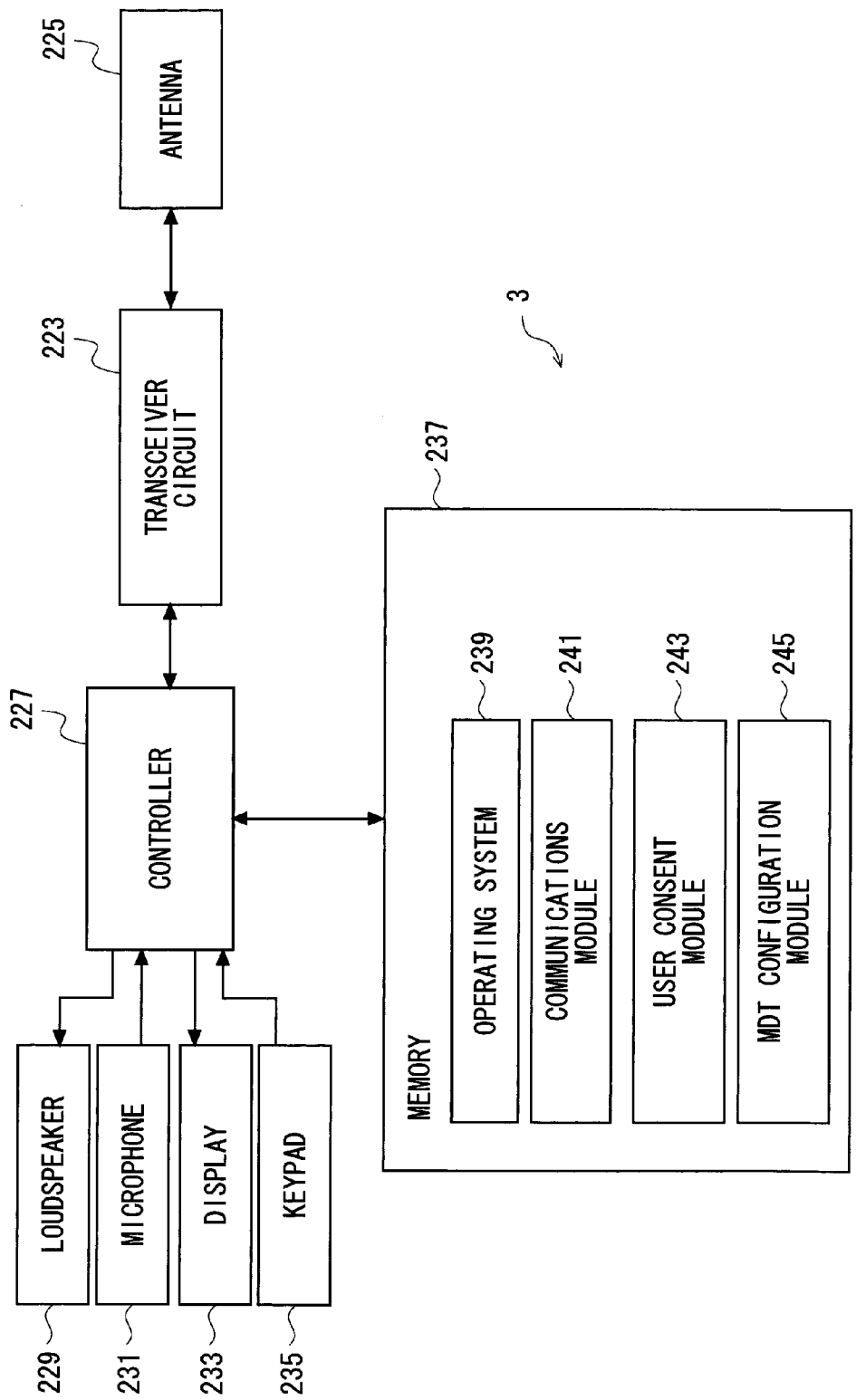
FIG. 2 shows a simplified block diagram of a mobile communication device forming part of the system shown in FIG. 1.

FIG. 2 schematically illustrates the main components of a mobile communication device 3 (UE) of FIG. 1. As shown, the mobile communication device comprises a mobile telephone 3 including transceiver circuit 223 which is operable to transmit signals to and to receive signals from the base station 5 via one or more antennae 225. As shown, the mobile communication device 3 also includes a controller 227 which controls the operation of the mobile communication device 3 and which is connected to the transceiver circuit 223 and to a loudspeaker 229, a microphone 231, a display 233, and a keypad 235. The controller 227 operates in accordance with software instructions stored within memory 237. As shown, these software instructions include, among other things, an operating system 239, a communications module 241, a user consent module 243, and a trace management module 245.

The communications module 241 manages the reception, transmission, and interpretation of signalling (e.g. radio resource control signalling) communicated with the base station 5. The user consent module 243 maintains the user consent indictor including the setting and updating of the user consent indicator. The user consent module 243 also manages the prompting of the user (e.g. via the display 233 and/or loudspeaker 229) to set/update the consent indicator and manages receipt of user input (e.g. via keypad 235) to set/update the consent indicator. The trace management module 245 manages trace sessions on the mobile communication device 3 including: configuration of trace sessions for MDT purposes; acquisition of measurements required for MDT purposes (either by undertaking new measurements or retrieving results of earlier measurements from memory) and location information; reporting MDT measurements and location related information; and flushing MDT measurement logs (e.g. in the event of an update of the consent indicator from 'consent' to 'unconsent').

UTRAN (NodeB and RNC)

As a person skilled in the art will appreciate the main control component of UTRAN 2-1 is the RNC 7. The base station (NodeB) 5-1 comprises radio frequency transmitter(s), radio frequency receiver(s) and one or more antennae for communication directly with the UEs 3. However, the NodeB 5-1 has minimum functionality, and is controlled by the RNC 7.

Figure 3:
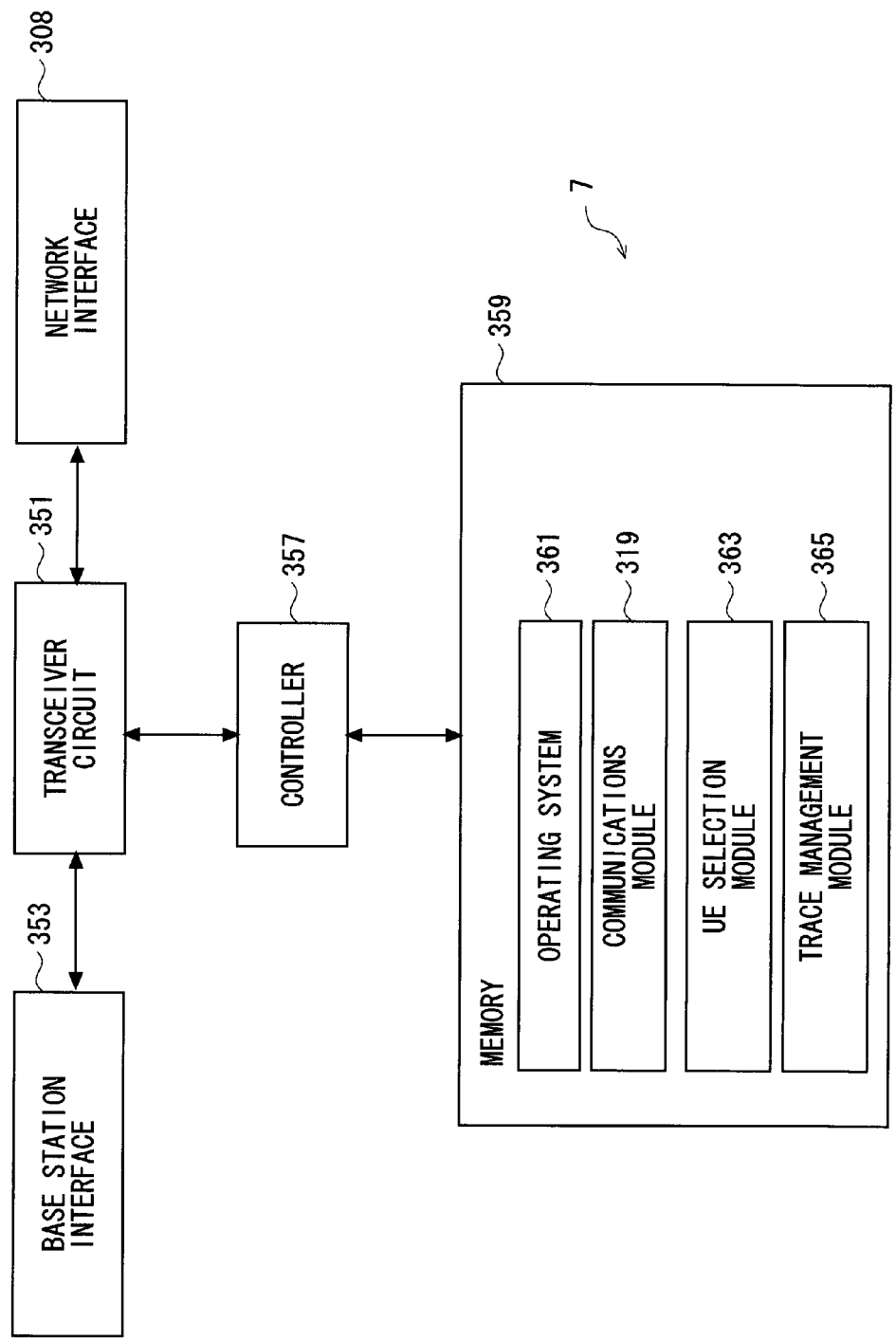
FIG. 3 is a simplified block diagram of a radio network controller (RNC) forming part of the system shown in FIG. 1.

FIG. 3 is a block diagram illustrating the main components of the RNC 7 shown in FIG. 1. As shown, the RNC 7 includes transceiver circuit 351, which is operable to transmit signals to, and to receive signals from the mobile communication device 3 via the base station interface 353 and one or more antennae of the NodeB 5-1. The transceiver circuit 351 is also operable to communicate with the EM 11-1 and the TCE 13-1 of the core network 8-1 via a network interface 308.

The operation of the transceiver circuit 351 is controlled by a controller 357, in accordance with software stored in memory 359. The software includes, among other things, an operating system 361, a communications module 319, a UE selection module 363 and a trace management module 365.

The communications module 319 is operable to manage communications with the mobile communication device 3 via the base station interface 353, and with the core network 8-1 via the network interface 308. The UE selection module 363 manages the selection of UEs 3 for MDT purposes. The trace management module 365 manages trace sessions in the RNC 7 including: handling trace session communications from the EM 11-1 in the core network 8-1; managing configuration of trace sessions for MDT purposes on the UE 3; and the receipt and handling of MDT measurement reports.

E-UTRAN (eNodeB)

Figure 4:
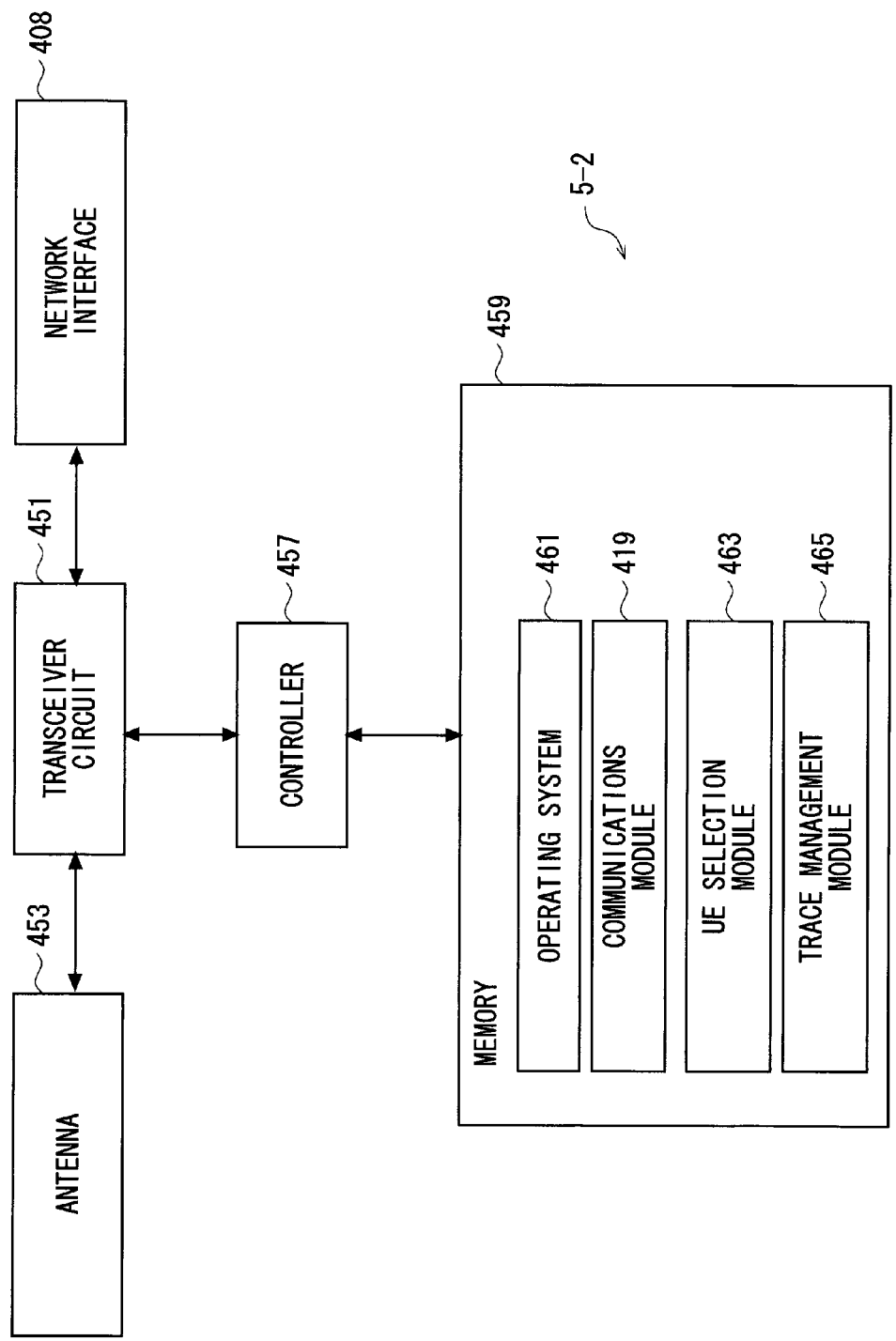
FIG. 4 is a simplified block diagram of a base station forming part of the system shown in FIG. 1.

FIG. 4 is a block diagram illustrating the main components of the eNodeB 5-2 shown in FIG. 1. As shown, the base station 5-2 includes transceiver circuit 451, which is operable to transmit signals to, and to receive signals from the mobile communication device 3 via one or more antennae 453. The transceiver circuit 451 is also operable to communicate with the MME 9, the EM 11-2 and the TCE 13-2 of the EPC 8-2 via a network interface 308.

The operation of the transceiver circuit 451 is controlled by a controller 457, in accordance with software stored in memory 459. The software includes, among other things, an operating system 461, a communications module 419, a UE selection module 463 and a trace management module 465.

The communications module 419 is operable to manage communications with the mobile communication device 3 via the antennae 453, and with the EPC 8-2 via the network interface 408. The UE selection module 463 manages the selection of UEs 3 for MDT purposes. The trace management module 465 manages trace sessions in the base station 5-2 including: handling trace session communications from the EM 11-2 in the EPC 8-2; managing configuration of trace sessions for MDT purposes on the UE 3; and the receipt and handling of MDT measurement reports.

Element Manager

Figure 5:
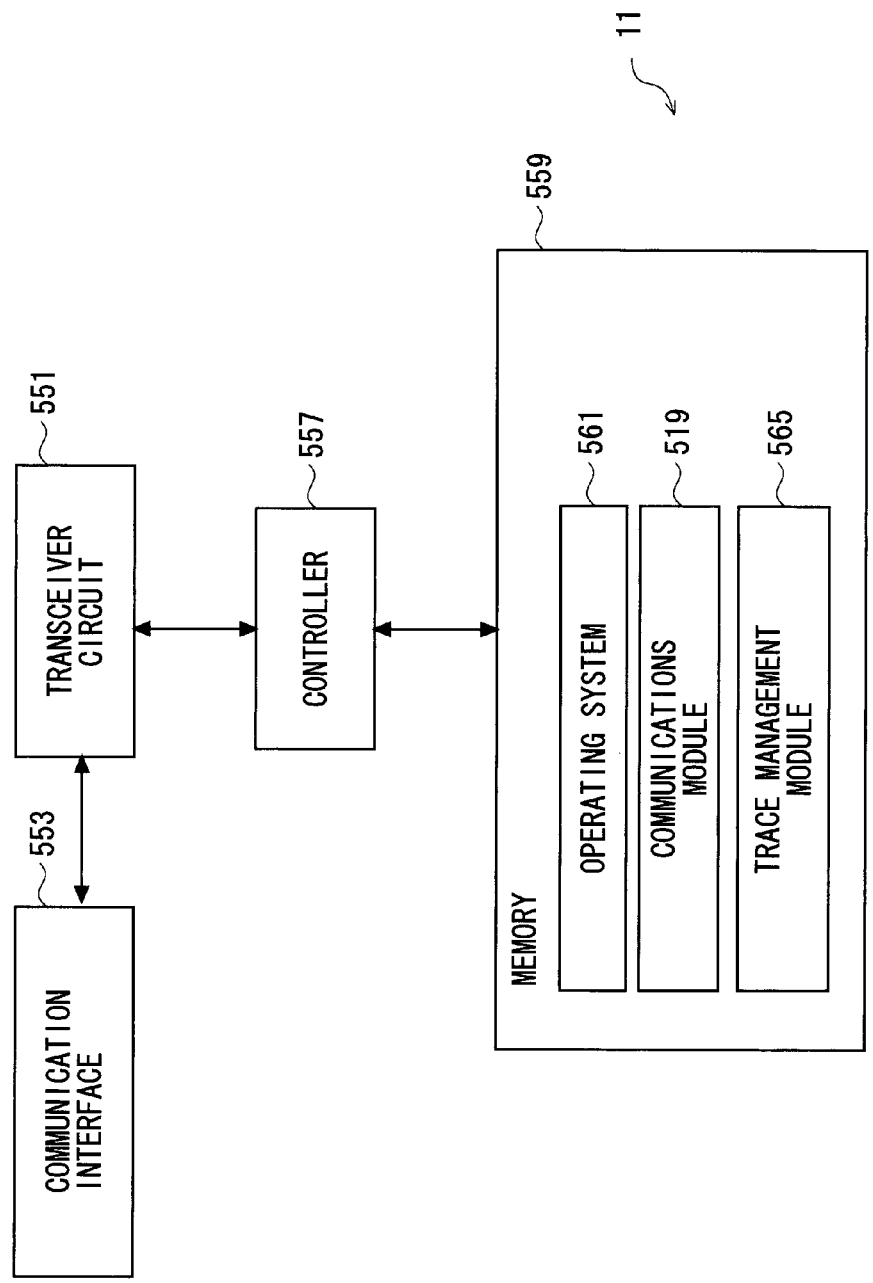
FIG. 5 is a simplified block diagram of an element manager (EM) forming part of the system shown in FIG. 1.

FIG. 5 is a block diagram illustrating the main components of the element managers 11 shown in FIG. 1. As shown, the element manager includes transceiver circuit 551, which is operable to transmit signals to, and to receive signals from, other network entities via a communication interface 553.

The operation of the transceiver circuit 551 is controlled by a controller 557, in accordance with software stored in memory 559. The software includes, among other things, an operating system 561, a communications module 519, and a trace management module 565.

The communications module 519 is operable to manage communications with the other network entities (e.g. the NodeB 5-1/RNC 7 or the eNodeB 5-2) via the communication interface 553. The trace management module 565 manages trace sessions including: activation and termination of trace sessions; communicating trace session requirements (including UE MDT configuration information) to the RAN 2-1, 2-2 etc.

MDT Procedure—Overview

Figure 6:
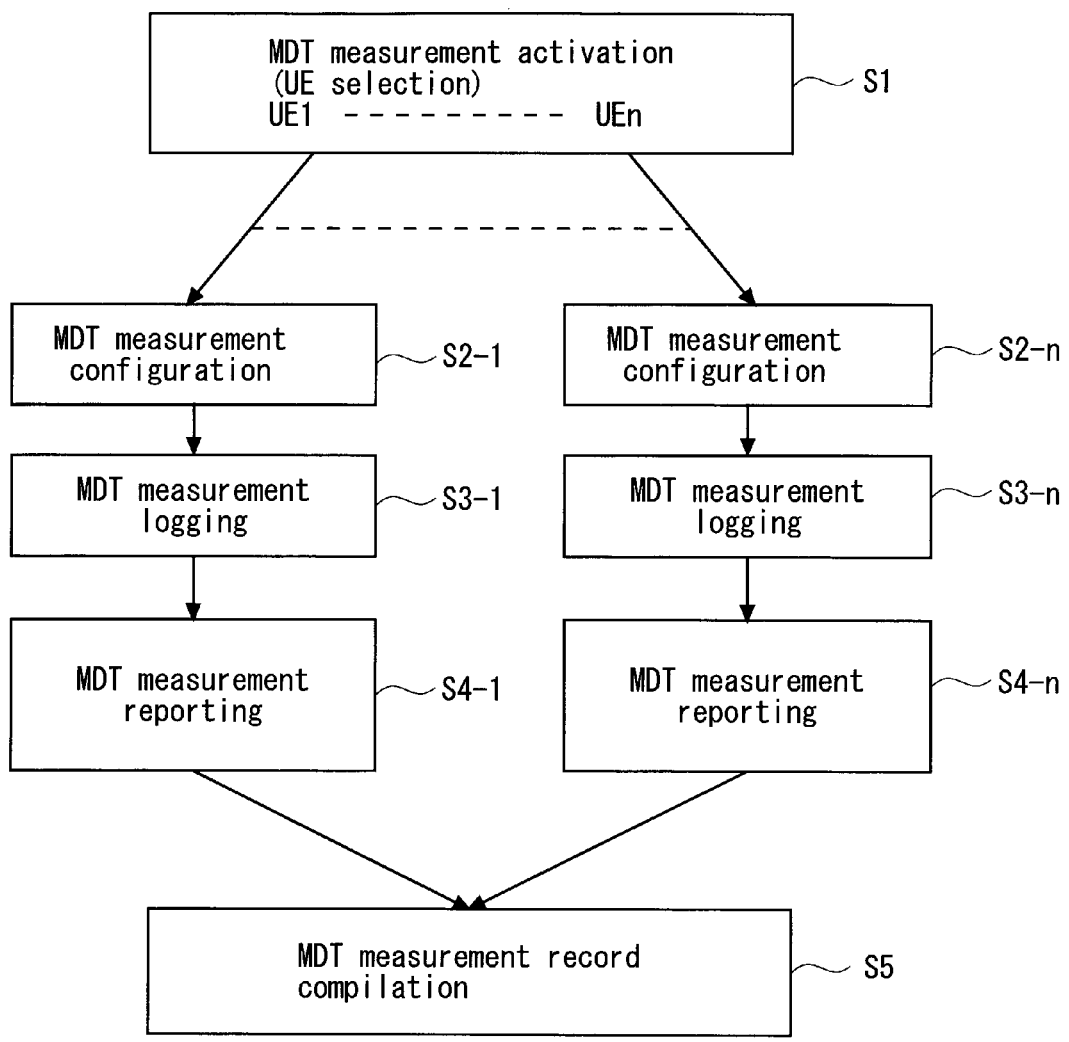
FIG. 6 is a high level flow chart illustrating a procedure implemented by the communication system 1 for minimisation of drive test (MDT).

FIG. 6 is a high-level flow chart illustrating a procedure implemented by the communication system 1 in order to implement the MDT functionality.

As seen in FIG. 6 the procedure begins with an MDT measurement activation phase (S1) during which a trace session is activated for MDT purposes by the EM 11 requesting the RAN 2 to select UEs 3 for MDT measurements purposes. Accordingly, the RAN 2 selects at least one UE 3 for measurement purposes.

Following the MDT measurement activation phase (S1), an MDT measurement configuration phase (S2-1 to S2-$n$ respectively for each selected UE 3-1 to 3-$n$) is entered during which the RAN 2 configures each of the selected UEs 3.

After configuration of a UE 3, in the MDT measurement configuration phase (S2), the procedure enters an MDT measurement logging phase (S3-1 to S3-$n$ respectively for each selected UE 3-1 to 3-$n$) during which the selected UE 3 logs the requested radio measurements and acquires location related information (subject to user consent considerations).

Once measurements and any location related information has been acquired by a selected UE 3 in the MDT measurement logging phase (S3), the selected UE (3) reports the measurements/location related information (subject to user consent considerations) in an MDT measurement reporting phase (S4). The measurement reporting may occur, for example, when the RAN 2 requests that the UE 3 reports the logged MDT measurements.

After the measurements/location related information have been reported to the RAN 2, the RAN 2 communicates the reported information to the TCE 13, which then compiles the information for all the selected UEs 3 in an MDT measurement record compilation phase (S5).

There are a number of different approaches in which the various stages of the procedure of FIG. 6 may be implemented, each of which provides different benefits. These include: a first 'minimal impact' approach in which, when a user does not consent to the provision of location related information, the UE 3 does not perform logged MDT measurements, does perform immediate MDT measurements (e.g. for connected mode mobility purposes) but does not report user location information; a second 'UE managed' approach in which the UE 3 performs logged MDT measurements including the logging of location related information but, when a user has not consented to the provision of the location related information, the UE 3 ensures that the location related information is not included in the user location information; and a third 'system managed' approach in which the UE 3 indicates user consent, or lack of consent, to the network (and updates the network in the event of change of consent) and in which the network manages selection of UEs 3 for MDT measurements, in dependence on the current status of the consent.

A generalised process for implementing the MDT will be described first, for ease of understanding, before respective embodiments for implementing each of the three different approaches discussed above are described further.

MDT Subscriber and Equipment Trace Procedures—Overview

Figure 7:
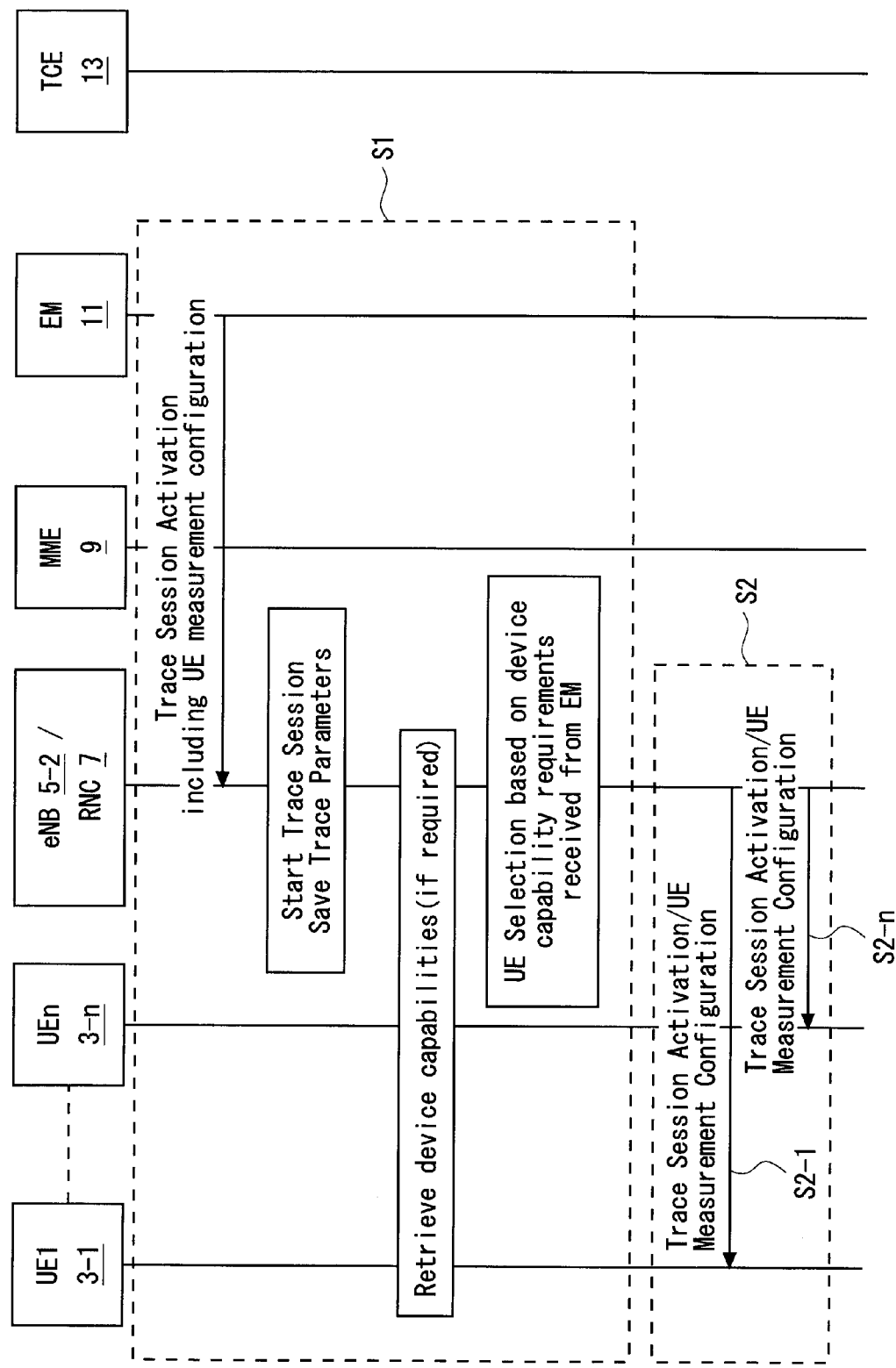
FIG. 7 is a generalised timing diagram illustrating subscriber and equipment trace procedures implemented in a measurement activation phase and a measurement configuration phase of FIG. 6.
Figure 8:
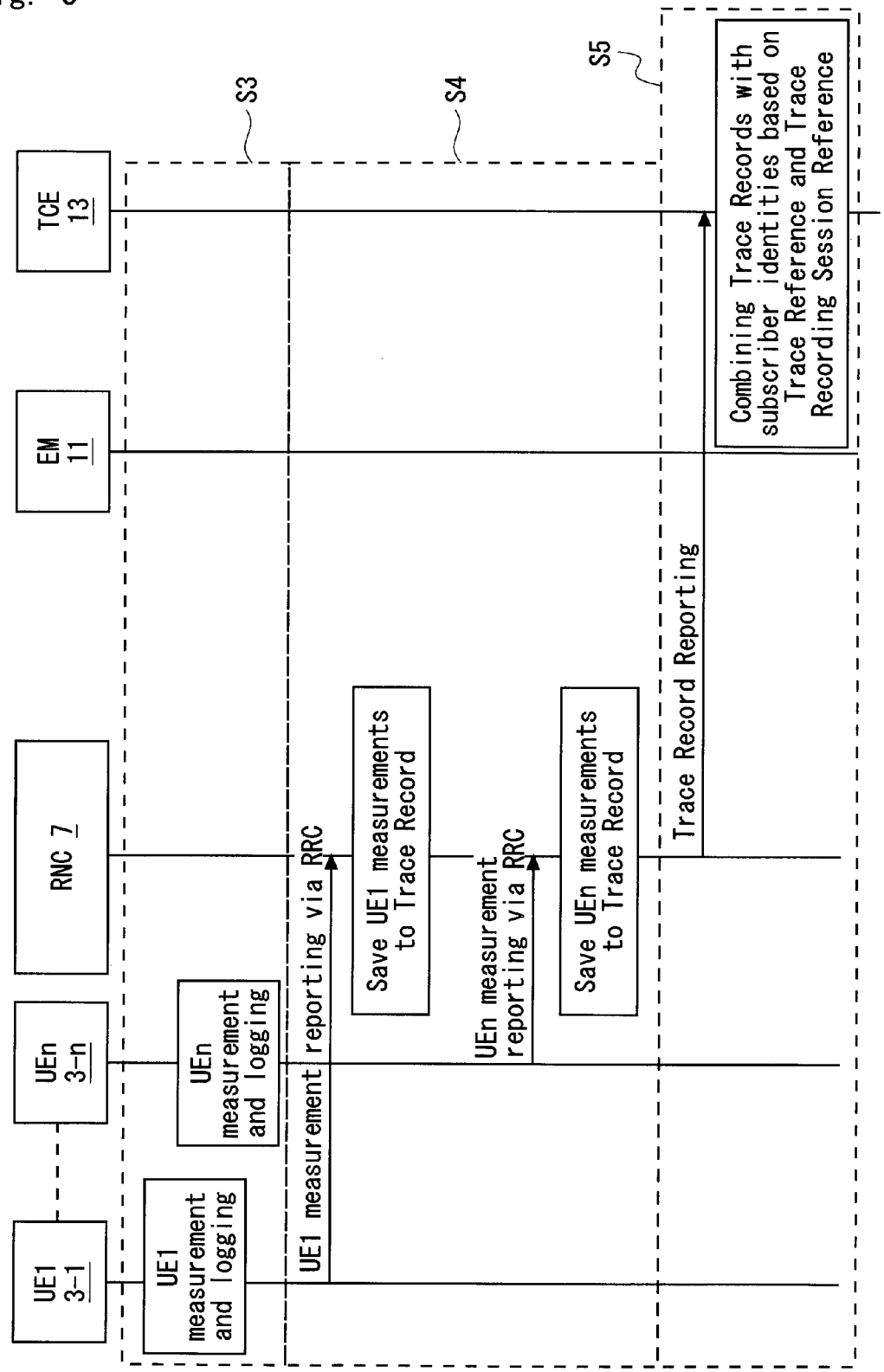
FIG. 8 is a generalised timing diagram illustrating subscriber and equipment trace procedures implemented in a measurement logging phase, a measurement reporting phase, and a report compilation phase of FIG. 6 for a UTRAN.
Figure 9:
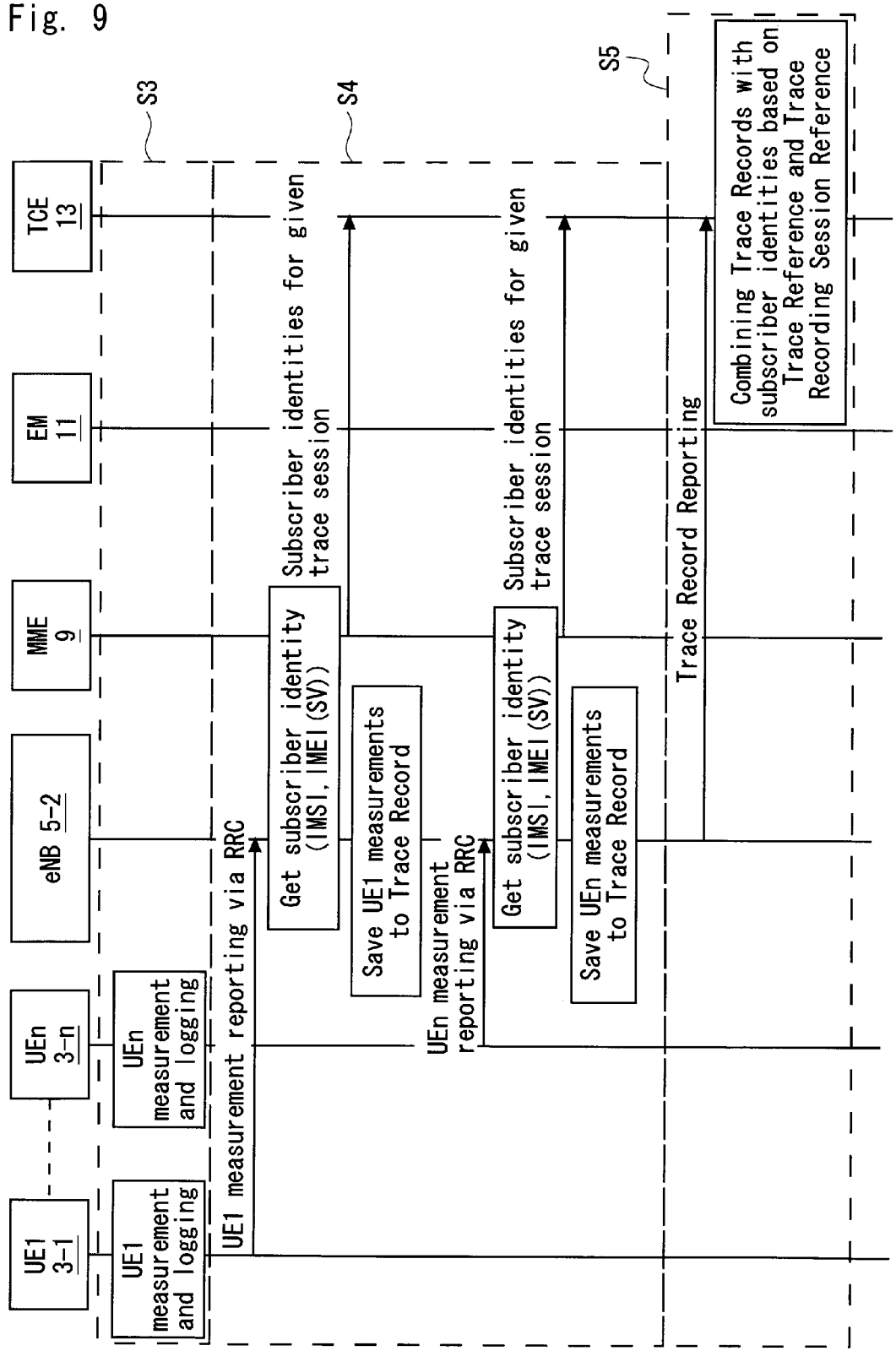
FIG. 9 is a generalised timing diagram illustrating subscriber and equipment trace procedures implemented in a measurement logging phase, a measurement reporting phase, and a report compilation phase of FIG. 6 for an E-UTRAN.

FIGS. 7 to 9 illustrate generalised subscriber and equipment trace procedures, for the UTRAN 2-1 and E-UTRAN 2-2 based communication networks, which procedures are suitable for use in implementing steps S1 to S5 of FIG. 6.

FIG. 7 is a generalised timing diagram illustrating the subscriber and equipment trace procedures implemented in the activation (S1) and configuration (S2) phases of FIG. 6.

(S1) MDT Measurement Activation (UTRAN/E-UTRAN)

As seen in FIG. 7 the EM 11 sends a Trace Session activation request to the RNC 7 (in the case of the UTRAN) or the eNB 5-2 (in the case of E-UTRAN). This request includes the parameters for configuring UE measurements including, for example: information identifying the list of cells in for which measurements should be collected; device capability requirements (for example, minimum battery status, free memory, etc.) and optionally including (if appropriate) a required UE Capability (e.g. UE Category etc.); a list of measurements to be acquired; and/or the like.

When the RNC 7/eNB 5-2 receives the Trace Session activation request from the EM 11, it initiates a Trace Session and saves configuration parameters associated with the Trace Session. The RNC 7/eNB 5-2 retrieves the device capabilities from all UEs 3 active in the cell(s) if the device capability requirement is given for the Trace Session and the RNC 7/eNB 5-2 has not retrieved the device capabilities previously.

The RNC 7/eNB 5-2 then selects suitable UEs 3 for MDT data collection. The selection is based on a comparison of the device capability requirements received from EM 11 with the actual UE capabilities obtained from the UEs 3. If device capabilities are not given the UE selection may be made based on a UE Capability indicating whether or not MDT is supported by the UE 3.

(S2) MDT Measurement Configuration (UTRAN/E-UTRAN)

After selection of the UEs the RNC 7/eNB 5-2 activates the MDT functionality in the selected UEs 3 by sending Trace Session Activation/UE Measurement Configuration signalling. As part of this operation the RNC 7/eNB 5-2 allocates a Trace Recording Session Reference and sends appropriate configuration information to the UE.

In case of Logged MDT the configuration information may, for example, include the following: a 'Trace Reference'; a 'Trace Recording Session Reference'; and IP address of TCE; a logging Interval; a logging duration; and/or an absolute time reference. In case of Immediate MDT the information may, for example, include the following: a list of measurements; a reporting trigger; a report interval; a report amount; and/or an event threshold (e.g. if event based reporting is configured in reporting trigger). Those skilled in the art will appreciate that definitions of all these parameters are provided in published document 3GPP TS 32.422 V 10.2.0.

FIGS. 8 and 9 are generalised timing diagrams illustrating the subscriber and equipment trace procedures implemented in the logging (S3), reporting (S4), and record compilation (S5) phases of FIG. 6, for UTRAN and E-UTRAN respectively.

(S3 to S5) MDT Measurement Logging and Reporting and Report Compilation (UTRAN)

As seen in FIG. 8, when each UE 3 receives the Trace Session Activation/UE Measurement Configuration signalling including the MDT configuration information from the RNC 7, the UE 3 initiates the MDT measurement and logging functionality based on the received configuration parameters.

The MDT related measurements are reported to the RNC 7 using RRC signalling. In case of Logged MDT the MDT reporting is done when the network requests the log. Specifically, a UE 3 configured to perform Logged MDT measurements in idle mode can indicate the availability of MDT measurements by means of a one bit indicator in an RRC message (e.g. an RRC Connection Setup Complete message during connection establishment). The MDT log may then be requested by the RNC 7 sending a UE Information Request message. The MDT log is then sent by the UE 3 in the UE Information Response message. The UE 3 reports the Trace Reference, Trace Recording Session Reference and IP address of TCE 13 together with the MDT reports to the network in the case of Logged MDT.

When the RNC 7 receives the MDT report from the UE 3, the RNC 7 inserts the report into a Trace Record. The Trace Records compiled in this way are forwarded to a TCE 13 (as identified in the MDT report received from the UE 3 in the case of Logged MDT) where they are compiled based on the Trace Reference and Trace Recording Session Reference.

(S3 to S5) MDT Measurement Logging and Reporting and Report Compilation (E-UTRAN)

As seen in FIG. 9, when each UE 3 receives the Trace Session Activation/UE Measurement Configuration signalling including the MDT configuration information from the eNodeB 5-2, the UE 3 initiates the MDT measurement and logging functionality based on the received configuration parameters.

The MDT related measurements are reported to the eNodeB 5-2 using RRC signalling.

A UE 3 configured to perform Logged MDT measurements in idle mode can indicate the availability of MDT measurements by means of a one bit indicator in an RRC message (e.g. an RRC Connection Setup Complete message during connection establishment). The eNodeB 5-2 can decide to retrieve the logged measurements based on this indication by sending a UE Information Request message to the UE 3. The UE can respond with the collected MDT logs in a UE Information Response message. The UE 3 reports the Trace Reference, Trace Recording Session Reference and IP address of TCE 13 together with the MDT reports to the network in the case of Logged MDT.

The eNodeB 5-2 then contacts the MME 9 to request that the MME 9 send the subscriber identities (IMSI, IMEI(SV)) to the TCE 13 for the given UE 3, which reported the MDT reports to the eNodeB 5-2.

When the eNodeB 5-2 receives the MDT report from the UE 3 in the RRC message the eNodeB 5-2 inserts it into a trace record. The Trace Records compiled in this way are forwarded to a TCE 13 (identified in the MDT report received from the UE 3 in case of Logged MDT) where they are compiled based on the Trace Reference and Trace Recording Session Reference.

Minimal Impact Approach

FIGS. 10 to 13 illustrate the subscriber and equipment trace procedures for implementing the first 'minimal impact' approach described above. The approach illustrated in FIGS. 10 to 13 is built on the generalised subscriber and equipment trace procedures described in detail with reference to FIGS. 7 to 9 and, for reasons of clarity, only a single UE 3 is shown and a full description of each step of the procedure is not repeated.

(S1) MDT Measurement Activation

Figure 10:
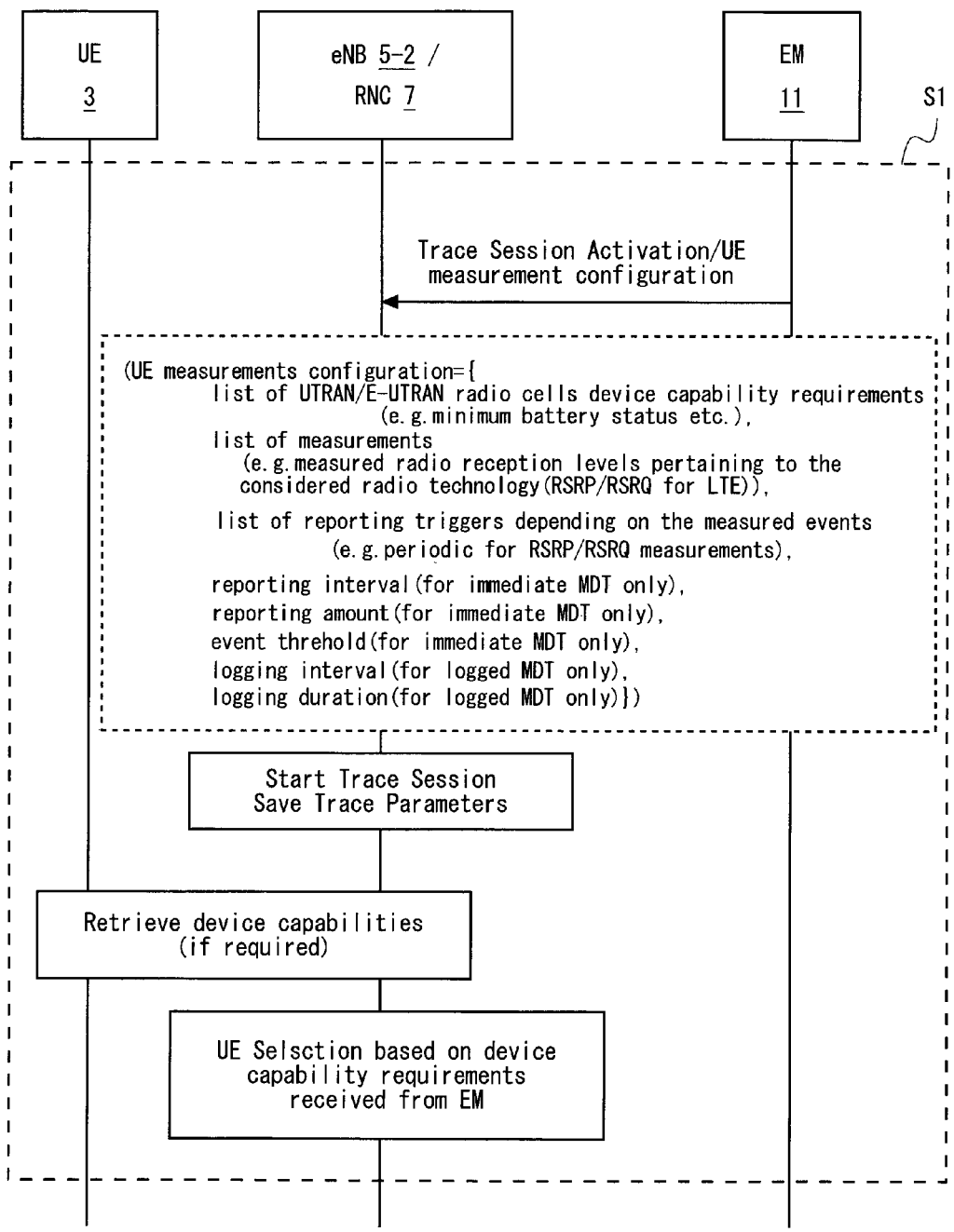
FIG. 10 is a simplified timing diagram illustrating subscriber and equipment trace procedures implemented in a measurement activation phase of FIG. 6 according to one embodiment.

FIG. 10 is a simplified timing diagram illustrating the subscriber and equipment trace procedures implemented in the measurement activation phase (S1) of FIG. 6 for the minimal impact approach.

As seen in FIG. 10 the measurement activation phase (S1) follows the procedure as described with reference to the measurement activation phase (S1) of FIG. 7. However, FIG. 10 illustrates, in greater detail, the nature of the configuration parameters which may be sent in the Trace Session Activation/UE measurement configuration signalling. Specifically, the UE configuration parameters may include: a list of UTRAN/E-UTRAN radio cells device capability requirements (e.g. minimum battery status etc.); a list of required measurements, for example, measured radio reception levels for the radio technology in question (Reference Signal Received Power/Reference Signal Received Quality (RSRP/RSRQ) for LTE); a list of reporting triggers depending on the measured events (e.g. periodic for RSRP/RSRQ measurements); a reporting interval (for immediate MDT); reporting amount (for immediate MDT); an event threshold (for immediate MDT); a logging interval (for logged MDT); and/or a logging duration (for logged MDT).

When the RNC 7/eNB 5-2 receives the Trace Session activation request from the EM 11, it initiates a Trace Session and saves the associated configuration parameters before retrieving the device capabilities from the UEs 3 active in the each cell listed in the configuration parameters (where these capabilities have not been retrieved previously). The RNC 7/eNB 5-2 completes the selection of suitable UEs 3 as described previously.

(S2 and S3) MDT Measurement Configuration and Reporting (for Logged MDT)

Figure 11:
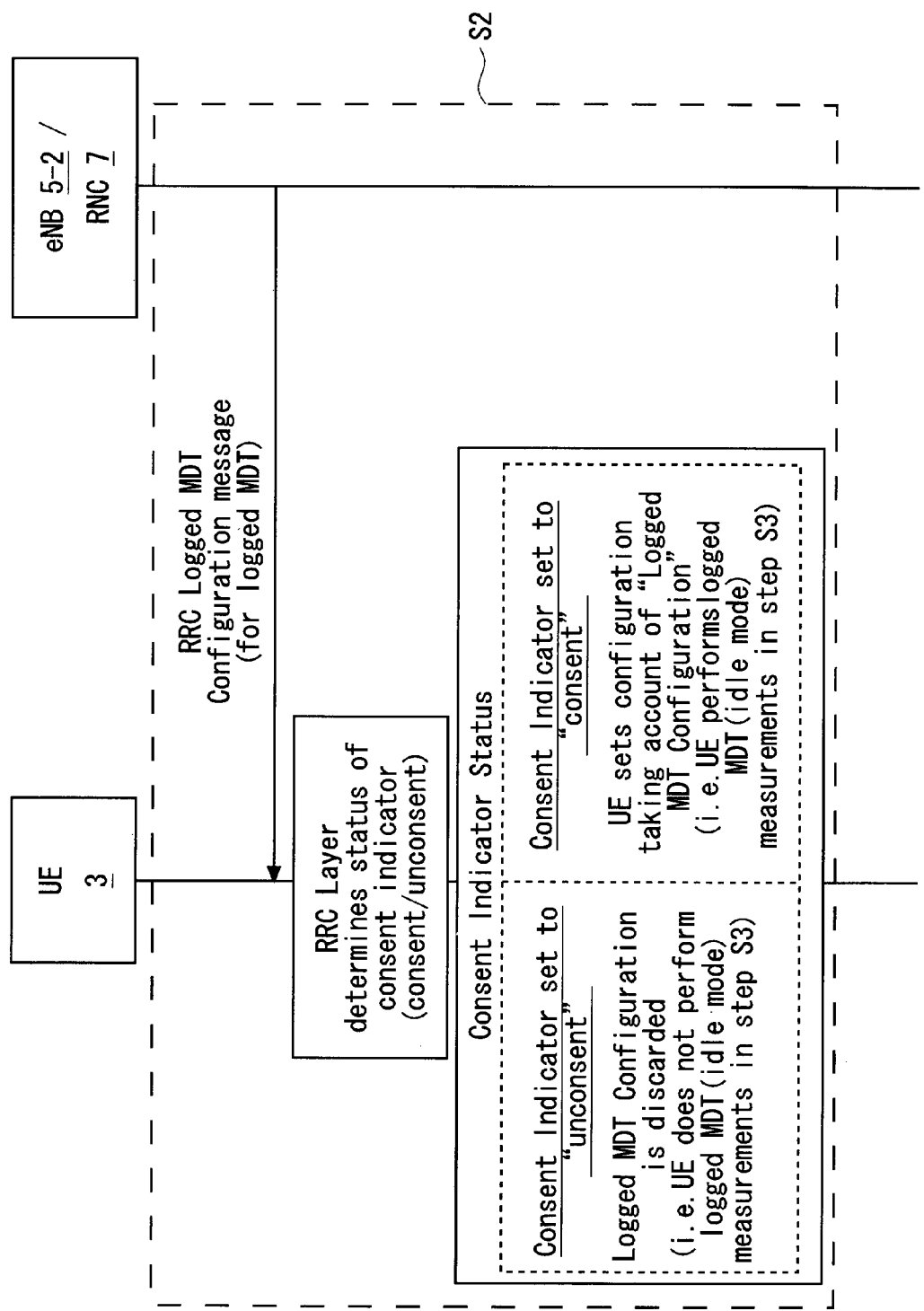
FIG. 11 is a simplified timing diagram illustrating subscriber and equipment trace procedures implemented in a measurement configuration phase of FIG. 6 according to the embodiment of FIG. 10.

FIG. 11 is a simplified timing diagram illustrating the subscriber and equipment trace procedures implemented in the measurement configuration phase (S2) of FIG. 6 in the event of a request for Logged MDT measurements. The measurement configuration phase (S2) broadly follows the procedure as described with reference to the measurement configuration phase (S2) of FIG. 7. However, FIG. 11 illustrates, in greater detail, how the user consent parameter is used, in the minimal impact approach, to provide a beneficial balance between the network operator's need for location information for MDT purposes and user privacy.

As seen in FIG. 11 the UE 3 receives Trace Session Activation/UE measurement configuration signalling comprising an RRC Logged MDT Configuration message for initiating the Logged MDT measurement. However, before engaging in any measurement logging, the RRC layer of the UE 3 determines the status of the user consent indicator.

If the consent indicator is set to "unconsent" the Logged MDT Configuration is discarded meaning that the UE 3 does not perform any logged MDT (idle mode) measurements and therefore does not enter the measurement logging phase (S3). Effectively, therefore, the UE 3 simply ignores the configuration message. If, on the other hand, the consent indicator is set to "consent" the UE sets the MDT configuration taking account of the "Logged MDT Configuration" parameters meaning that the UE performs the requested logged MDT (idle mode) measurements in measurement logging phase (S3), as described with reference to the measurement logging phase (S3) of FIG. 8 and FIG. 9.

(S2 and S3) MDT Measurement Configuration and Reporting (Immediate MDT measurement)

For the minimal impact approach, in the case of immediate MDT measurement, the configuration proceeds essentially as described with reference to the measurement configuration phase (S2) of FIG. 7.

Figure 12:
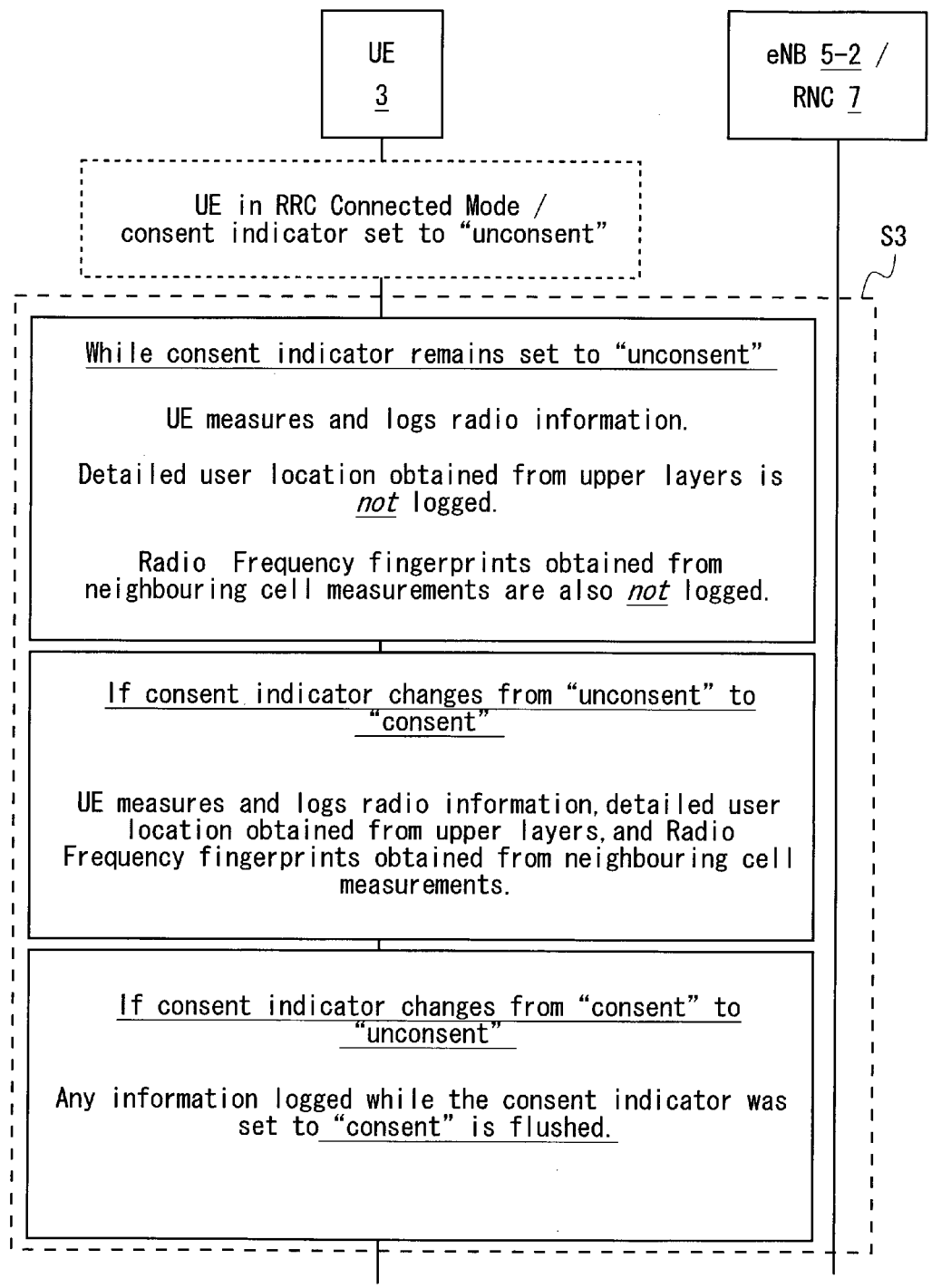
FIG. 12 is a simplified timing diagram illustrating subscriber and equipment trace procedures implemented in a measurement logging phase of FIG. 6 according to the embodiment of FIG. 10.

FIG. 12 is a simplified timing diagram illustrating the subscriber and equipment trace procedures implemented in the measurement logging phase (S3) of FIG. 6 in the event of Immediate MDT measurements. The measurement logging phase (S3) broadly follows the procedure as described with reference to the measurement logging phase (S3) of FIG. 8 or FIG. 9. However, FIG. 12 illustrates, in greater detail, how the user consent parameter is used, in the minimal impact approach, to provide a beneficial balance between the network operator's need for location information for MDT purposes and user privacy.

In connected mode the measurements may be for MDT purposes or some other general purpose (e.g. connected mode mobility). When the UE 3 receives configuration parameters the UE 3 can deduce the purpose of the measurements from 'IncludeLocationRequest' information in the configuration information. In this situation, the UE 3 will perform MDT radio measurements regardless of the user consent indicator.

In the exemplary situation shown in FIG. 12, the user consent indicator of the UE begins in an 'unconsent' status indicating that the user has indicated that user consent to the provision of location related information has been withheld. As seen in FIG. 12, while consent indicator remains set to "unconsent", the UE nevertheless continues to measure and log radio information. However, detailed user location information obtained from upper layers is not logged, and radio frequency fingerprints obtained from neighbouring cell measurements are also not logged. If, later, the consent indicator changes from "unconsent" to "consent" then the UE 3 begins to measure and log radio information, detailed user location obtained from upper layers, and Radio Frequency fingerprints obtained from neighbouring cell measurements.

If, later still, the consent indicator changes from "consent" to "unconsent" then any information logged while the consent indicator was set to "consent" is flushed from memory to ensure that location related information is not inadvertently sent, against the user's wishes, to the network. It will be appreciated that, whilst the flushing of logged information when the consent indicator changes from "consent" to "unconsent" is described for a connected mode UE 3, the flushing may also be used for avoiding transmission of Logged MDT measurements.

(S4) MDT Measurement Reporting

Figure 13:
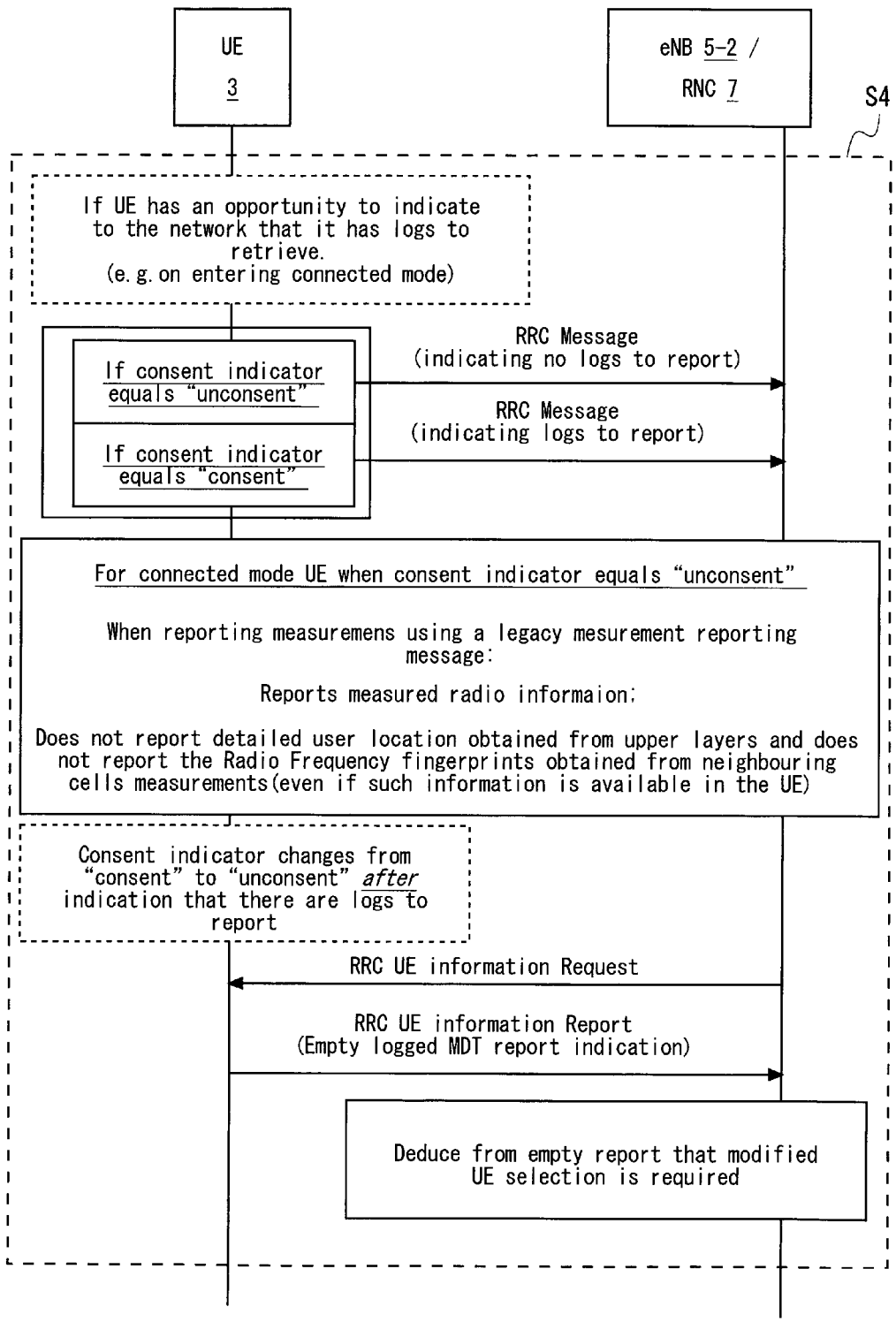
FIG. 13 is a simplified timing diagram illustrating subscriber and equipment trace procedures implemented in a measurement reporting phase of FIG. 6 according to the embodiment of FIG. 10.

FIG. 13 is a simplified timing diagram illustrating the subscriber and equipment trace procedures implemented in the measurement reporting phase (S4) of FIG. 6 for the minimal impact approach.

The measurement reporting phase (S4) broadly follows the procedure as described with reference to the measurement reporting phase (S4) of FIG. 8 or FIG. 9 (depending on the RAN 2). However, FIG. 13 illustrates, in greater detail, how the user consent parameter is used, in the minimal impact approach, to provide a beneficial balance between the network operator's need for location information for MDT purposes and user privacy.

As seen in FIG. 13, when a UE 3 that has collated Logged MDT measurements has an opportunity to indicate the availability of the MDT measurement logs to be retrieved, and if the consent indicator is set to 'unconsent', then an RRC message is sent without indicating that logs are available to retrieve. Otherwise, if the consent indicator is set to 'consent' then an RRC message is sent indicating that such logs are available to retrieve. An opportunity to indicate the availability of the MDT measurements may comprise, for example, an opportunity to set the one bit indicator in RRC Connection Setup Complete message during connection establishment as mentioned above or to set a similar indicator in RRC Connection Reconfiguration Complete (further to Radio Link failure recovery and connected mode mobility).

For a connected mode UE 3 reporting measurements using a legacy measurement reporting message, even when consent indicator equals "unconsent", the UE 3 reports the measurements that it has acquired. However, the legacy message will include the measured radio information but will not include location related information (even if this information is available in the UE 3) because it has not logged this information for MDT purposes in the measurement logging phase (S3).

In the event that the consent indicator changes from "consent" to "unconsent" after an indication has been sent that there are measurement logs to retrieve, and the network requests the measurement logs using an RRC UE Information Request message, then the UE 3 responds with the RRC UE Information Report, but instead of including the actual measurement logs it includes an empty logged MDT report indication. Thus, the RNC 7/eNodeB 5-2 is able to deduce from the empty reporting that a modified UE selection is necessary and, accordingly, modifies the UE selection in order to ensure that the necessary information can be acquired for MDT purposes.

(S5) MDT Measurement Report Compilation

The MDT measurement report compilation phase (S5), for the minimal impact approach, follows the procedure described for the MDT measurement report compilation phase (S5) with reference to FIG. 8 and FIG. 9.

In summary, therefore, in the minimal impact approach, the UE effectively ignores any logged MDT configuration request from the network in case of user unconsent. Then, the UE reports empty MDT measurements when requested by the network for reporting (e.g. in the case when the consent has changed to "unconsent" since the time when the UE has indicated logs are available for retrieval). The UE may provide an indication of empty logged MDT reporting in the RRC UE Information Report message.

UE Managed Approach

Figure 14:
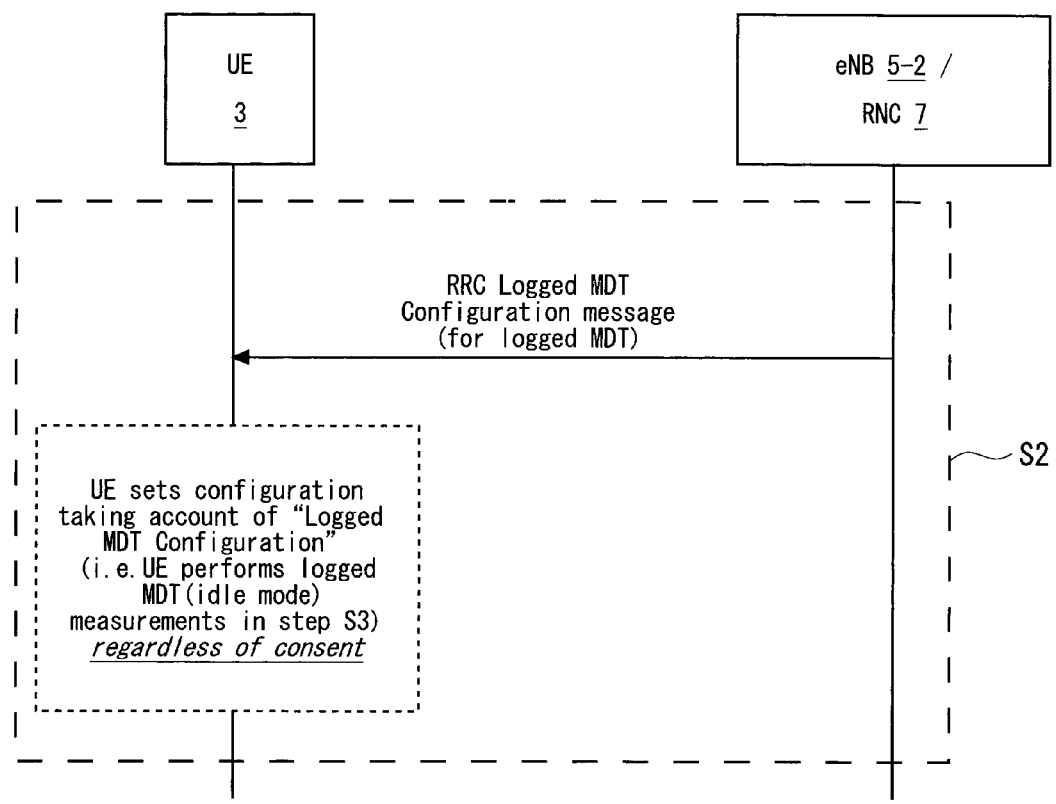
FIG. 14 is a simplified timing diagram illustrating subscriber and equipment trace procedures implemented in a measurement configuration phase of FIG. 6 according to another embodiment.
Figure 15:
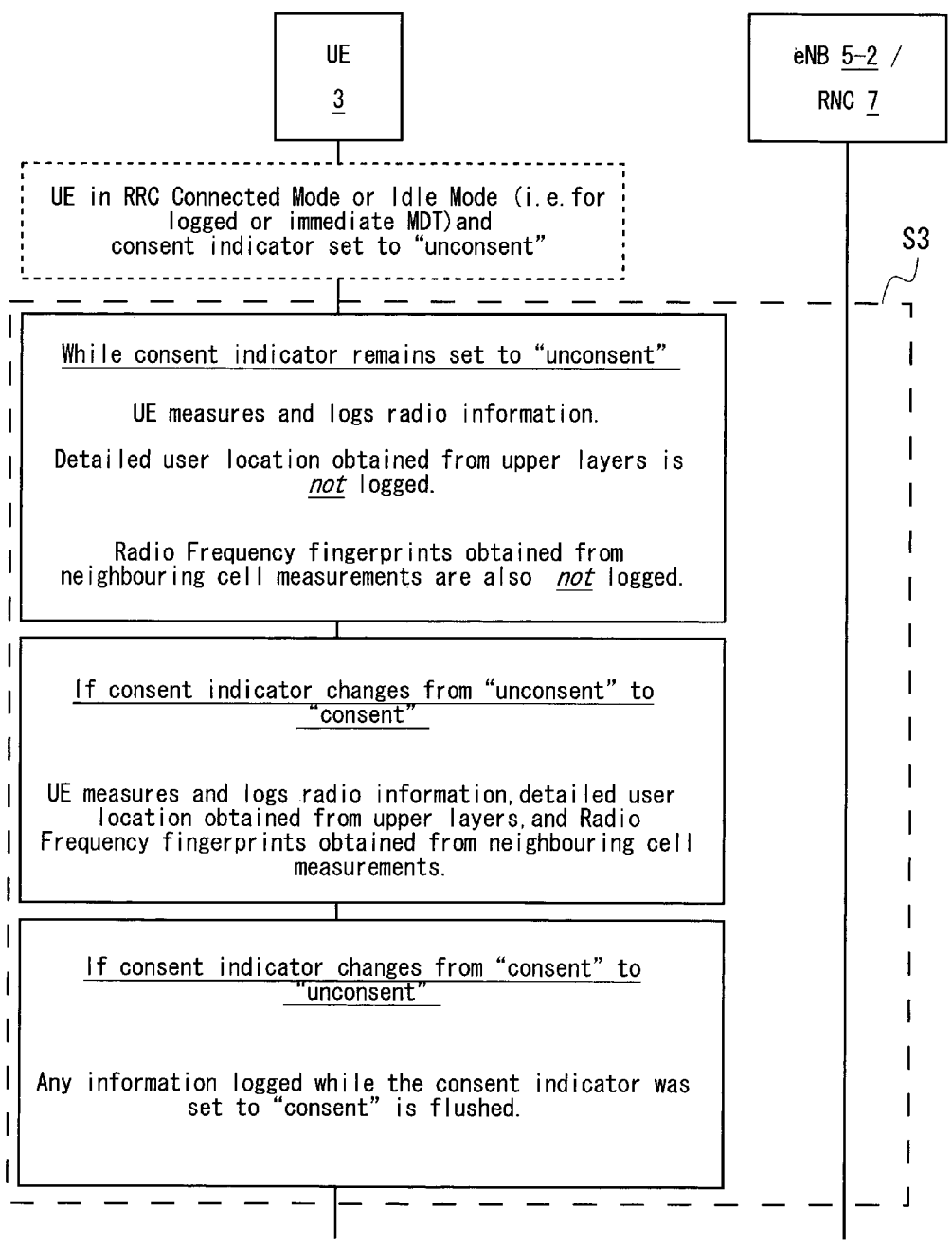
FIG. 15 is a simplified timing diagram illustrating subscriber and equipment trace procedures implemented in a measurement logging phase of FIG. 6 according to the embodiment of FIG. 14.
Figure 16:
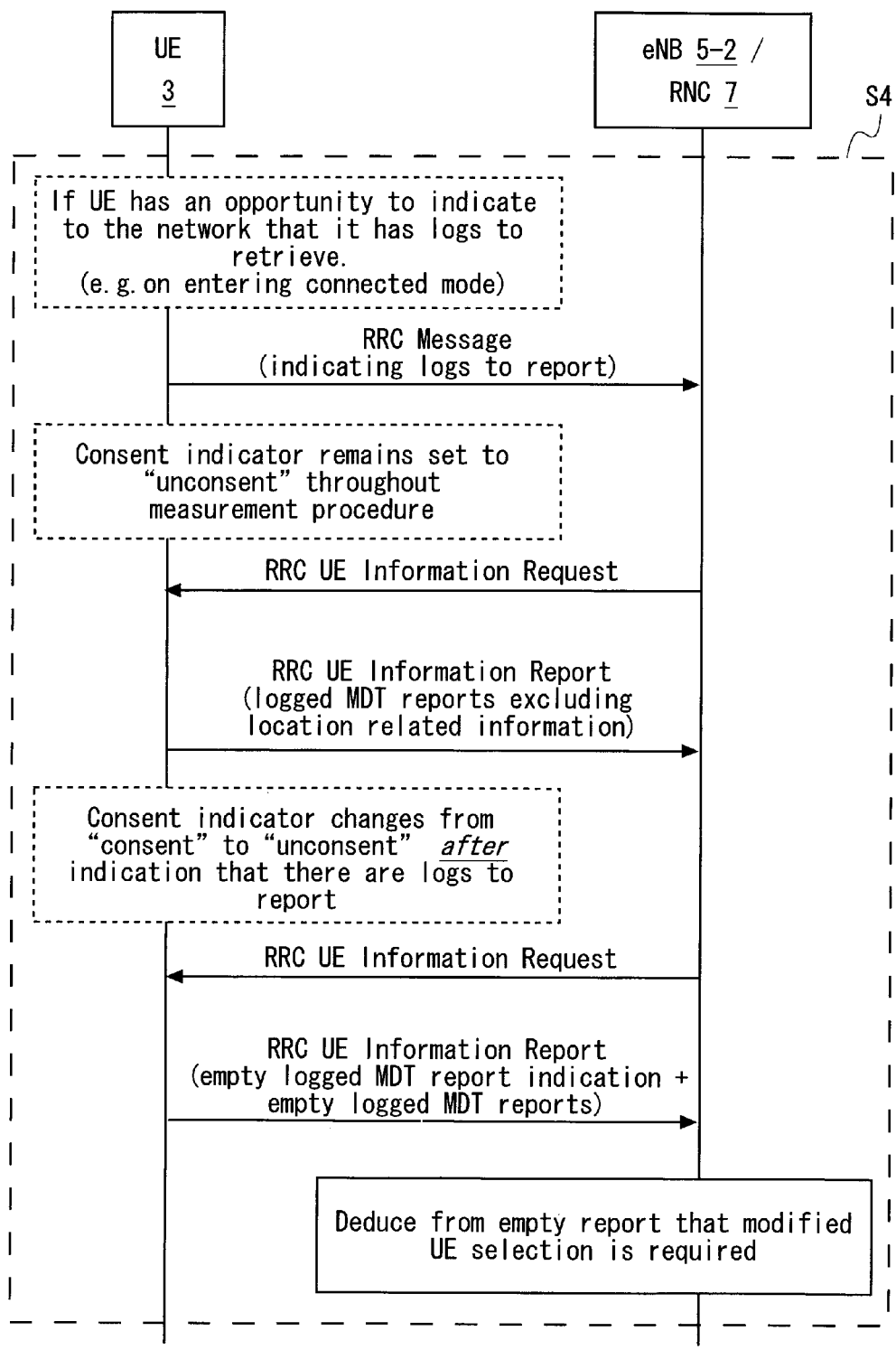
FIG. 16 is a simplified timing diagram illustrating subscriber and equipment trace procedures implemented in a measurement reporting phase of FIG. 6 according to the embodiment of FIG. 14.

FIGS. 14 to 16 illustrate the subscriber and equipment trace procedures for implementing the second 'UE Managed' approach described above. The approach illustrated in FIGS. 14 to 16 is built on the generalised subscriber and equipment trace procedures described in detail with reference to FIGS. 7 to 9 and, for reasons of clarity, only a single UE 3 is shown and a full description of each step of the procedure is not repeated.

(S1) MDT Measurement Activation

The measurement activation phase (S1) for the UE managed approach is essentially the same as described for the minimal impact approach described above with reference to FIG. 10 and will not be repeated here for reasons of conciseness.

(S2) MDT Measurement Configuration and Reporting

FIG. 14 is a simplified timing diagram illustrating the subscriber and equipment trace procedures implemented in the measurement configuration phase (S2) of FIG. 6 in the event of a request for Logged MDT measurements. The measurement configuration phase (S2) broadly follows the procedure as described with reference to the measurement configuration phase (S2) of FIG. 7. However, FIG. 14 illustrates, in greater detail, how the user consent parameter is used, in the UE managed approach and, in particular, differences between the UE managed approach and the minimal impact approach.

As seen in FIG. 14 the UE 3 receives Trace Session Activation/UE measurement configuration signalling comprising an RRC Logged MDT Configuration message for initiating the Logged MDT measurement as described with reference to FIG. 11 for the minimal impact approach. However, unlike the procedure shown in FIG. 11, the UE does not ignore the request if the user consent indicator is set to 'unconsent'. Instead, the UE sets the MDT configuration taking account of the "Logged MDT Configuration" parameters, regardless of the status of the consent parameter, meaning that the UE will perform the requested logged MDT measurements in measurement logging phase (S3) as described with reference to the measurement logging phase (S3) of FIG. 8 and FIG. 9.

For the UE managed approach, in the case of immediate MDT measurement, the configuration proceeds essentially as described with reference to the measurement configuration phase (S2) of FIG. 7.

(S3) MDT Measurement Configuration and Reporting

FIG. 15 is a simplified timing diagram illustrating the subscriber and equipment trace procedures implemented in the measurement logging phase (S3) of FIG. 6 in the event of both Logged MDT and Immediate MDT measurements. The measurement logging phase (S3) broadly follows the procedure as described with reference to the measurement logging phase (S3) of FIG. 8 or FIG. 9. However, FIG. 15 illustrates, in greater detail, how the user consent parameter is used, in the UE managed approach, to provide a beneficial balance between the network operator's need for location information for MDT purposes and user privacy.

In the exemplary situation shown in FIG. 15, the user consent indicator of the UE begins in an 'unconsent' status indicating that the user has indicated that user consent to the provision of location related information has been withheld. As seen in FIG. 15, while consent indicator remains set to "unconsent" the UE nevertheless continues to measure and log radio information (for Logged or Immediate MDT measurements). However, detailed user location obtained from upper layers is not logged, and radio frequency fingerprints obtained from neighbouring cell measurements are also not logged. If, later, the consent indicator changes from "unconsent" to "consent" then the UE 3 begins to measure and log radio information, detailed user location obtained from upper layers, and Radio Frequency fingerprints obtained from neighbouring cell measurements.

If, later still, the consent indicator changes from "consent" to "unconsent" then any information logged while the consent indicator was set to "consent" is flushed from memory to ensure that location related information is not inadvertently sent, against the user's wishes, to the network.

(S4) MDT Measurement Reporting

FIG. 16 is a simplified timing diagram illustrating the subscriber and equipment trace procedures implemented in the measurement reporting phase (S4) of FIG. 6 for the UE managed approach.

The measurement reporting phase (S4) broadly follows the procedure as described with reference to the measurement reporting phase (S4) of FIG. 8 or FIG. 9 (depending on the RAN 2). However, FIG. 16 illustrates, in greater detail, how the user consent parameter is used, in the UE managed approach in two different scenarios, to provide a beneficial balance between the network operator's need for location information for MDT purposes and user privacy.

As seen in FIG. 16, when a UE 3 that has logged MDT measurements has an opportunity to indicate the availability of the MDT measurement reports for retrieval then an RRC message is sent indicating that such logs are available to retrieve. An opportunity to indicate the availability of the MDT measurements may comprise, for example, an opportunity to set the one bit indicator in RRC Connection Setup Complete message during connection establishment as mentioned above or to set a similar indicator in RRC Connection Reconfiguration Complete (further to Radio Link failure recovery and connected mode mobility).

In the first illustrated scenario, in the event that the consent indicator has remained set to "unconsent" throughout measurement, and the network requests the measurement logs using an RRC UE Information Request message, then the UE 3 responds with the RRC UE Information Report including the UE radio measurements as logged in the measurement logging phase (i.e. without user detailed location information or RF fingerprints) in the RRC UE Information report message.

In the second illustrated scenario, in the event that the consent indicator changes from "consent" to "unconsent" after an indication has been sent that there are measurement logs to retrieve, and the network requests the measurement logs using an RRC UE Information Request message, then the UE 3 responds with the RRC UE Information Report, but instead of including the measurement logs it includes an empty report indication along with empty logged MDT reports.

Thus, the RNC 7/eNodeB 5-2 is able to deduce from the missing location information, from the presence of the empty report indication, and/or from the empty logged MDT reports that a modified UE selection is necessary and, accordingly, modifies the UE selection in order to ensure that the necessary information can be acquired for MDT purposes.

(S5) MDT Measurement Report Compilation

The MDT measurement report compilation phase (S5), for the UE managed approach, follows the procedure described for the MDT measurement report compilation phase (S5) with reference to FIG. 8 and FIG. 9.

In summary, therefore, in the UE managed approach, the UE 3 keeps any logged MDT configuration request from the network; even in the case of user unconsent. This information therefore beneficially remains available for use if the user consent indicator is updated to consent later. The UE 3 provides an indication of empty logged MDT reporting, for example in an RRC UE Information Report message to indicate that location and/or radio frequency fingerprints are missing from the MDT reports.

System Managed Approach

Figure 17:
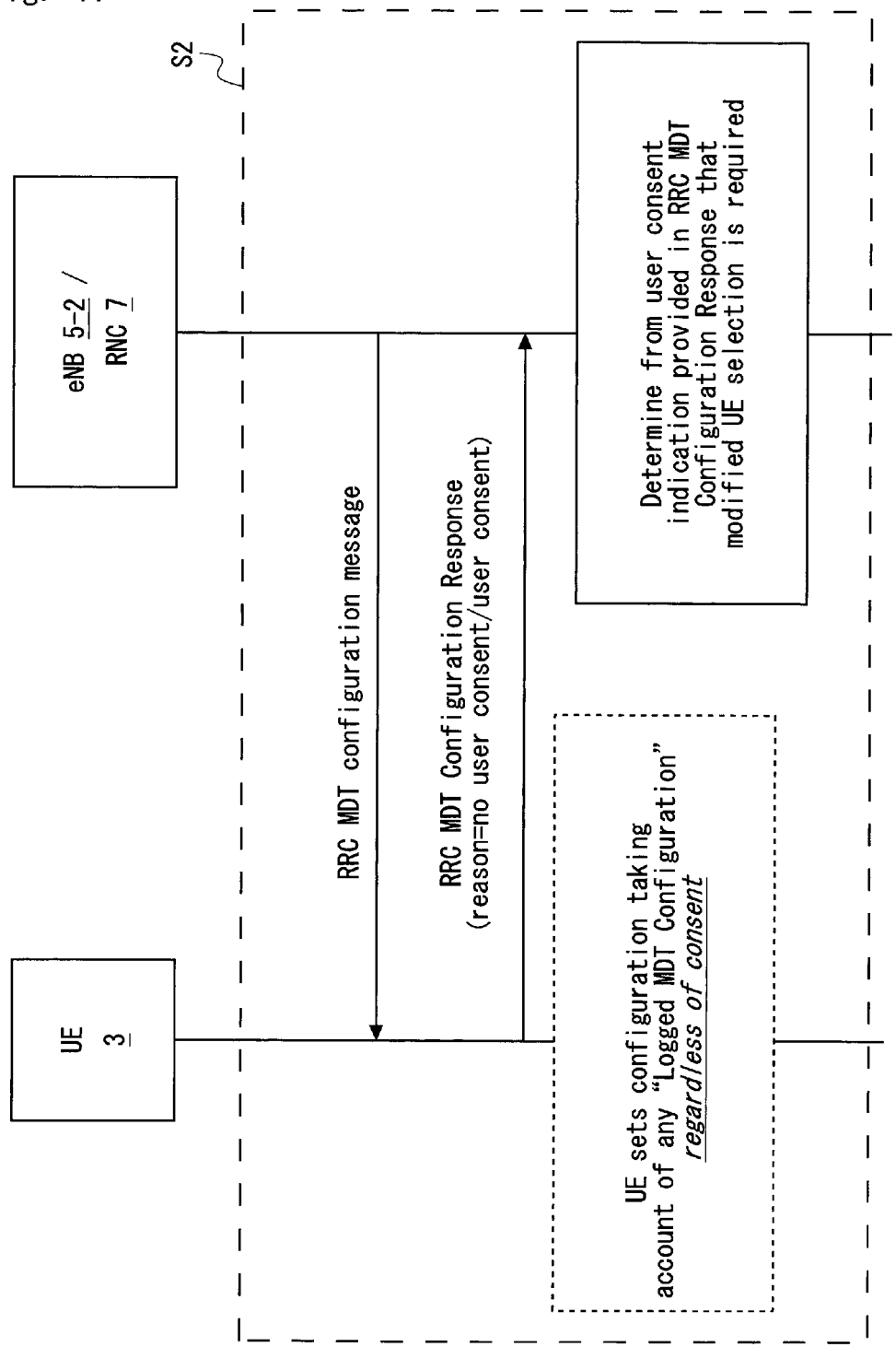
FIG. 17 is a simplified timing diagram illustrating subscriber and equipment trace procedures implemented in a measurement configuration phase of FIG. 6 according to another embodiment.
Figure 18:
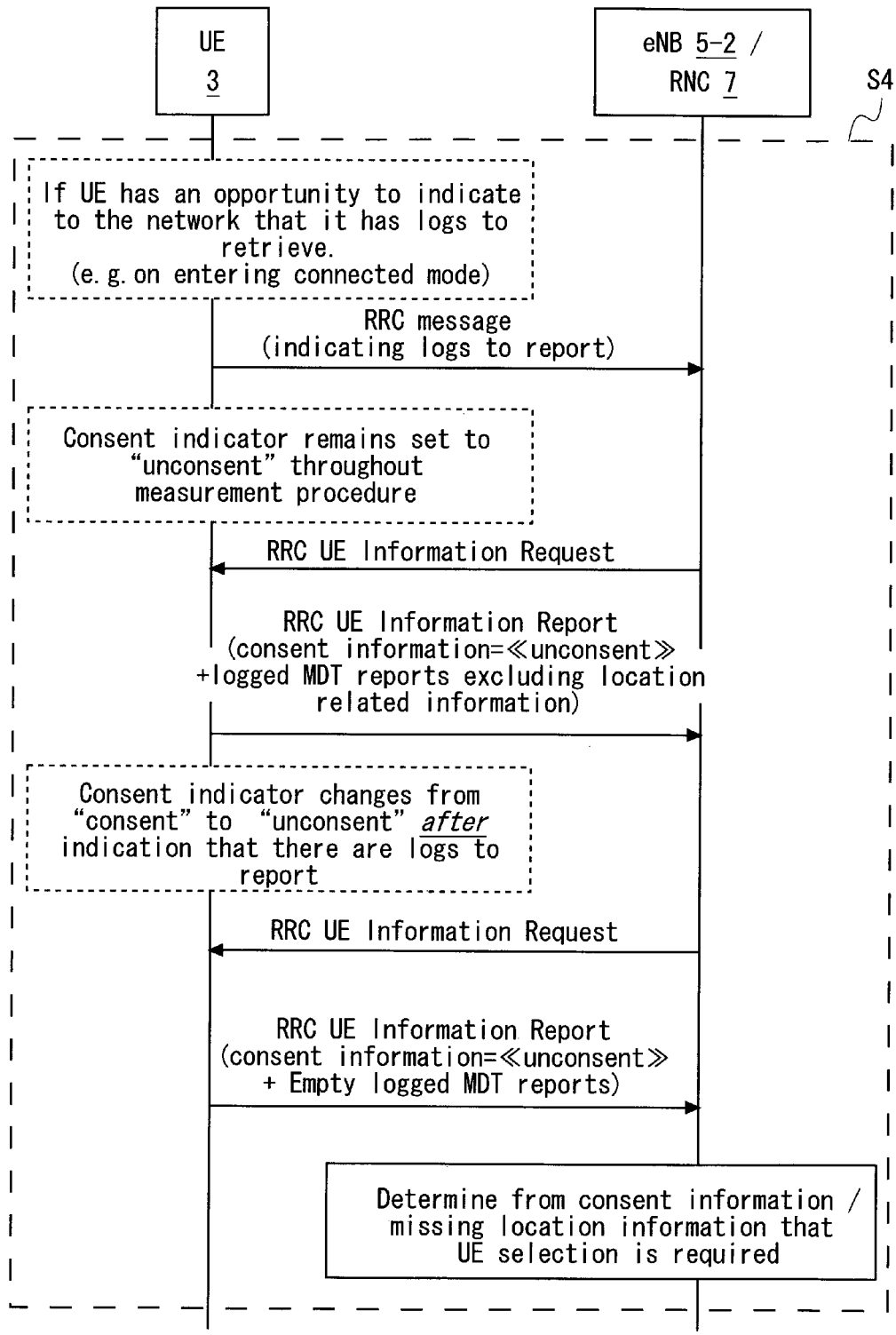
FIG. 18 is a simplified timing diagram illustrating subscriber and equipment trace procedures implemented in a measurement reporting phase of FIG. 6 according to the embodiment of FIG. 14.

FIGS. 17 and 18 illustrate the subscriber and equipment trace procedures for implementing the second 'system managed' approach described above. The approach illustrated in FIGS. 17 and 18 is built on the generalised subscriber and equipment trace procedures described in detail with reference to FIGS. 7 to 9 and, for reasons of clarity, only a single UE 3 is shown and a full description of each step of the procedure is not repeated.

(S1) MDT Measurement Activation

The measurement activation phase (S1) for the system managed approach is essentially the same as described for the minimal impact approach described above with reference to FIG. 10 and will not be repeated here for reasons of conciseness.

(S2) MDT Measurement Configuration and Reporting

FIG. 17 is a simplified timing diagram illustrating the subscriber and equipment trace procedures implemented in the measurement configuration phase (S2) of FIG. 6 in the event of an RRC message requesting MDT measurements. The measurement configuration phase (S2) broadly follows the procedure as described with reference to the measurement configuration phase (S2) of FIG. 7. However, FIG. 17 illustrates, in greater detail, how the user consent parameter is used in the system managed approach and, in particular, differences between the system managed approach and the UE managed and minimal impact approaches.

As seen in FIG. 17, the UE 3 receives Trace Session Activation/UE measurement configuration signalling comprising an RRC MDT configuration message (e.g. an RRC Logged MDT Configuration message for initiating the Logged MDT measurement or the like). The UE 3 responds to this RRC MDT configuration message with an RRC MDT configuration response message (e.g. a Logged MDT Configuration Response message) including information identifying the status (consent or unconsent) of the user consent indicator.

The UE 3 then sets the MDT configuration taking account of any "Logged MDT Configuration" parameters, regardless of the status of the consent parameter, meaning that the UE will perform any requested logged MDT measurements in measurement logging phase (S3) as described with reference to the measurement logging phase (S3) of FIG. 8 and FIG. 9.

Thus, when the RAN 2 needs to select UEs 3 for MDT purposes, having received the user consent information from each previously selected UE 3 in the RRC MDT configuration response message, the RAN 2 can avoid selection of UEs for which the user consent indication indicates a lack of consent (i.e. the user consent indication is set to "unconsent").

(S3) MDT Measurement Configuration and Reporting

The MDT measurement configuration phase (S3), for the system managed approach, follows the procedure described for the MDT measurement configuration phase (S3) of the UE managed approach, with reference to FIG. 15.

(S4) MDT Measurement Reporting

FIG. 18 is a simplified timing diagram illustrating the subscriber and equipment trace procedures implemented in the measurement reporting phase (S4) of FIG. 6 for the system managed approach.

The measurement reporting phase (S4) broadly follows the procedure as described with reference to the measurement reporting phase (S4) of FIG. 8 or FIG. 9 (depending on the RAN 2). However, FIG. 18 illustrates, in greater detail, how the user consent parameter is used, in the system managed approach in two different scenarios, to provide a beneficial balance between the network operator's need for location information for MDT purposes and user privacy.

As seen in FIG. 18, when a UE 3 that has logged MDT measurements has an opportunity to indicate the availability of the MDT measurement reports for retrieval then an RRC message is sent indicating that such logs are available to retrieve. An opportunity to indicate the availability of the MDT measurements may comprise, for example, an opportunity to set the one bit indicator in RRC Connection Setup Complete message during connection establishment as mentioned above or to set a similar indicator in e.g. RRC Connection Reconfiguration Complete or RRC Connection Reestablishment Complete (further to connected mode mobility and Radio Link failure recovery respectively).

In the first illustrated scenario, in the event that the consent indicator has remained set to "unconsent" throughout the measurement logging phase, and the network requests the measurement logs using an RRC UE Information Request message, then the UE 3 responds with the RRC UE Information Report including the UE radio measurements as logged in the measurement logging phase (i.e. without user detailed location information or RF fingerprints) in the RRC UE Information report message. However, consent information indicating the status (consent or unconsent) of the user consent indication is also included with the logged MDT reports excluding the location information.

In the second illustrated scenario, in the event that the consent indicator changes from "consent" to "unconsent" after an indication has been sent that there are measurement logs to retrieve, and the network requests the measurement logs using an RRC UE Information Request message, then the UE 3 responds with the RRC UE Information Report, but instead of including the measurement logs it includes consent information indicating the status (consent or unconsent) of the user consent indication along with empty logged MDT reports.

Thus, in either scenario the RNC 7/eNodeB 5-2 is able to deduce from the consent information (or the absence of location information) that a modified UE selection is necessary and, accordingly, optimises the UE selection in order to ensure that the necessary information can be acquired for MDT purposes.

(S5) MDT Measurement Report Compilation

The MDT measurement report compilation phase (S5), for the system managed approach, follows the procedure described for the MDT measurement report compilation phase (S5) with reference to FIG. 8 and FIG. 9.

In summary, therefore, in the system managed approach, the user consent/unconsent information (and any update of it) is sent from the UE to the RAN in radio layer (RRC) protocol messages (for example UE Information Report and/or a new RRC MDT configuration response message such as a Logged MDT Configuration Response message). For example, upon receipt of an RRC MDT Configuration Request, in case of unconsent, the UE sends a Logged MDT Configuration Response including an indicator that the UE consent indicator is set to "unconsent". Similarly, upon receipt of an MDT Information Request from the RAN 2, the new "unconsent" information is included if: the consent information has changed from "consent" to "unconsent" since the previous consent indication (e.g. in Logged MDT Configuration Response) was sent; and if a measurement report is being sent in which detailed location/RF fingerprint information is absent, or which is empty.

Modifications and Alternatives

A number of detailed embodiments and variations have been described above. As those skilled in the art will appreciate, a number of modifications and alternatives can be made to the above embodiments and variations whilst still benefiting from the inventions embodied therein.

For example, whilst a number of different embodiments employing different approaches are described separately, any aspect of the functionality they represent may be provided for in combination with or as an alternative to the functionality represented by a different approach. In particular, it will be appreciated that a choice of approach may be provided in the UE for a user (or provider) to configure the device to use any of the different approaches, or a particular aspect of an approach, independently.

It will be appreciated that whilst the Radio Frequency fingerprints obtained from neighbouring cell measurements are described as not being logged when detailed (e.g. GNSS) location information is not logged (e.g. see FIGS. 12 and 15), the Radio Frequency fingerprints may be logged because it can be relatively difficult to derive an actual user location from the Radio Frequency fingerprints, which are less precise and therefore less sensitive then the detailed location information. Accordingly, including Radio Frequency fingerprints represents a lesser risk than detail location information. For similar reasons, whilst the Radio Frequency fingerprints are described as not being reported when detailed location information is not reported (e.g. see FIG. 13) the Radio Frequency fingerprints may be reported instead of the detailed location information. Logging and reporting Radio Frequency fingerprints instead of detailed location information can be particularly advantageous because the Radio Frequency fingerprints still represent useful information which the network operator can use, without putting the end user's privacy at significant risk (compared to the provision of detailed location information).

It will also be appreciated that, in case of UE selection by an Operation, Administration and Maintenance (OAM) function, once the RAN 2 has reported the measurements (collected from UE 3) to the TCE 13, the TCE 3 may be adapted to determine, from the absence of user location information in the reports, that the TCE 3 should request the EM 11 to manage the configuration of MDT measurements by other or additional UEs 3.

Moreover, after the flushing of logged MDT information (e.g. in FIGS. 12 & 15), it will be appreciated that the MDT configuration may be discarded. Alternatively, the MDT configuration may be retained so that the configuration is available for re-use for future measurements should the user change the consent status back from unconsent to consent.

It will further be appreciated that the user consent/unconsent information can be propagated to and stored in a user profile in a Home Subscriber Server database of the network operator. This information can then further be used by the RAN to avoid selection of UEs that have indicated user unconsent. For example, in the system managed approach, the user consent information provided to the RAN 2, can be propagated to the network core 8 using a new (or a modified) S1/Iu Application Protocol message (e.g. as defined in 3GPP TS 36.413/25.413) and then from the core network to a Home Subscriber Server (HSS) using a new (or modified) diameter protocol message (as defined in 3GPP TS 29.272). The user consent indicator may be stored in the HSS within a profile for the user/UE 3. The OAM (Operation, Administration and Maintenance) function in the network may then use the user consent information stored by the HSS as an additional parameter, based upon which, UEs may be selected for MDT measurements in an optimised manner.

Moreover, the user consent information may alternatively or additionally be propagated to the EM 11 or TCE 13 using trace functions as defined in 3GPP TS 32.422. The OAM function can then access the user consent information directly from the TCE 13 or locally in the EM 11 for the purposes of optimised UE selection. Thus, the information can be used by the EM to avoid activating MDT on a UE 3 that has indicated user unconsent.

Nevertheless, the user consent information may beneficially remain in the RNC 7/eNB 5-2 (e.g. to avoid the additional signalling in the network that the above alternatives would entail). Then, as described for the system managed approach, when the RAN 2 needs to select UEs 3 for MDT purposes, while having received the user consent information from previously selected UEs 3, the RAN 2 can avoid selection of UEs for which the user consent indication indicates a lack of consent (i.e. the user consent indication is set to "unconsent").

It will be appreciated that although many of the logical/functional entities of the communication system 1 are described as physically separate entities, two or more of the entities may be combined into a single entity.

In the above embodiments, a mobile telephone based telecommunications system was described. As those skilled in the art will appreciate, the techniques described in the present application can be employed in other communications system. Other communications nodes or devices may include user devices such as, for example, personal digital assistants, laptop computers, web browsers, etc.

In the embodiments described above, the various entities illustrated in FIGS. 3 to 9 are described as having each including transceiver circuit. Typically, this circuit will be formed by dedicated hardware circuits. However, in some embodiments, part of the transceiver circuit may be implemented as software run by the corresponding controller.

In the above embodiments, a number of software modules were described. As those skilled in the art will appreciate, the software modules may be provided in compiled or un-compiled form and may be supplied to any of the various entities described as a signal over a computer network, or on a recording medium. Further, the functionality performed by part or all of this software may be performed using one or more dedicated hardware circuits. However, the use of software modules is preferred as it facilitates the updating of the various entities in order to update their functionalities.

Various other modifications will be apparent to those skilled in the art and will not be described in further detail here.

This software can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Various other modifications will be apparent to those skilled in the art and will not be described in further detail here.

As mentioned above, although the present invention is explained with reference to the illustrative embodiment, the present invention is not limited by the above. Various modifications understood by a person skilled in the art can be made within the scope of the invention.

This application is based upon and claims the benefit of priority from United Kingdom patent application No. 1100305.0 filed on 10 Jan., 2011, the disclosure of which is incorporated herein in its entirety by reference.

INDUSTRIAL APPLICABILITY

The present invention relates to communication system in which a mobile communication device is configured for taking measurements, and for reporting those measurements to another communication device. The invention has particular relevance to, but is not limited to, the implementation of an MDT (Minimisation of Drive Tests) procedure in the mobile communication device and other communication devices and entities of the communication system.

REFERENCE SIGNS LIST 1 communication system
2-1 UMTS radio access network (UTRAN)
2-2 LTE radio access network (E-UTRAN)
3-1 user equipment (UE)
3-2 user equipment (UE)
3-n user equipment (UE)
5-1 base station (NodeB)
5-2 base station (eNodeB(eNB))
7 Radio Network Controller (RNC)
8-1 Core Network (CN)
8-2 Evolved Packet Core (EPC)
9 Mobility Management Entity (MME)
11 element managers (EMs)
11-1 Element Manager (EM)
11-2 Element Manager (EM)
13-1 Trace Collection Entity (TCE)
13-2 Trace Collection Entity (TCE)
3 mobile communication device (UE)
223 transceiver circuit
225 antennae
227 controller
229 loudspeaker
231 microphone
233 display
235 keypad
237 memory
239 operating system
241 communications module
243 user consent module
245 trace management module
308 network interface
351 transceiver circuit
353 base station interface
357 controller
359 memory
361 operating system
319 communications module
363 UE selection module
365 trace management module
408 network interface
451 transceiver circuit
453 antenna
457 controller
459 memory
461 operating system
419 communications module
463 UE selection module
465 trace management module
551 transceiver circuit
553 communication interface
557 controller
559 memory
561 operating system
519 communications module
565 trace management module

The invention claimed is:

1. An eNodeB comprising:
a receiver unit that receives a message including user consent information, which is stored by a Home Subscriber Server (HSS) database, wherein the user consent information indicates a consent or non-consent of a user of a mobile communication device to a provision of location related data with measurement data obtained by the mobile communication device during a measurement session;
a selecting unit that selects mobile communication devices from which to obtain measurement data representing communication conditions in an area in which each selected mobile communication device is located and location related data for identifying a location to which said measurement data relates based on the user consent information.

2. A Radio Network Controller comprising:
a receiver unit that receives a message including user consent information, which is stored by a Home Subscriber Server (HSS) database, wherein the user consent information indicates a consent or non-consent of a user of a mobile communication device to a provision of location related data with measurement data obtained by the mobile communication device during a measurement session;

a selecting unit that selects mobile communication devices from which to obtain measurement data representing communication conditions in an area in which each selected mobile communication device is located and location related data for identifying a location to which said measurement data relates based on the user consent information.

3. A method performed by an eNodeB comprising:

receiving a message including user consent information, which is stored by a Home Subscriber Server (HSS) database, wherein the user consent information indicates a consent or non-consent of a user of a mobile communication device to a provision of location related data with measurement data obtained by the mobile communication device during a measurement session;

selecting mobile communication devices from which to obtain measurement data representing communication conditions in an area in which each selected mobile communication device is located and location related data for identifying a location to which said measurement data relates based on the user consent information.

4. A method performed by a Radio Network Controller comprising:

receiving a message including user consent information, which is stored by a Home Subscriber Server (HSS) database, wherein the user consent information indicates a consent or non-consent of a user of a mobile communication device to a provision of location related data with measurement data obtained by the mobile communication device during a measurement session;

selecting mobile communication devices from which to obtain measurement data representing communication conditions in an area in which each selected mobile communication device is located and location related data for identifying a location to which said measurement data relates based on the user consent information.

5. A mobile communication device comprising:

a measurement unit that measures measurement data representing communication conditions in an area in which said mobile communication device is located;

a obtaining unit obtains location related data for identifying a location to which said measurement data; and a providing unit provides said location related data with measurement data obtained by the mobile communication device during a measurement session after said mobile communication device is selected by a network entity based on user consent information, which is stored in a Home Subscriber Server (HSS) database, wherein the user consent information indicates a consent or non-consent of a user of the mobile communication device.

6. A method performed by a mobile communication device comprising:

measuring measurement data representing communication conditions in an area in which said mobile communication device is located;

obtaining location related data for identifying a location to which said measurement data; and providing said location related data with measurement data obtained by the mobile communication device during a measurement session after said mobile communication device is selected by a network entity based on user consent information, which is stored in a Home Subscriber Server (HSS) database, wherein the user consent information indicates a consent or non-consent of a user of the mobile communication device.

7. A mobile communication device in a mobile communication system including at least one of a eNodeB and a Radio Network Controller;

wherein user consent information related to the mobile communication device indicates a consent or non-consent of a user of the mobile communication device for providing location related data with measurement data obtained by the mobile communication device during a measurement session associated with information identifying the mobile communication device or the user; and is stored in a Home Subscriber Server (HSS) database;

wherein the mobile communication device is selected by the eNodeB or the Radio Network Controller based on the user consent information to provide measurement data representing communication conditions in an area in which each mobile communication device is located and location related data for identifying a location to which the measurement data relates.

8. A mobile communication device as claimed in claim 7 wherein the mobile communication device is selected by the eNodeB or the Radio Network Controller when the mobile communication device attaches to a network.

* * * * *